(12) United States Patent
Shiozaki

(10) Patent No.: US 11,910,081 B2
(45) Date of Patent: Feb. 20, 2024

(54) ELECTRONIC APPARATUS, METHOD FOR CONTROLLING THE SAME, AND STORAGE MEDIUM

(71) Applicant: CANON KABUSHIKI KAISHA, Tokyo (JP)

(72) Inventor: Tomoyuki Shiozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 17/550,873

(22) Filed: Dec. 14, 2021

(65) Prior Publication Data

US 2022/0109797 A1    Apr. 7, 2022

Related U.S. Application Data

(63) Continuation of application No. PCT/JP2020/021324, filed on May 29, 2020.

(30) Foreign Application Priority Data

Jun. 17, 2019  (JP) .................................. 2019-112315

(51) Int. Cl.
*H04N 23/63* (2023.01)
*G06F 3/0482* (2013.01)
(Continued)

(52) U.S. Cl.
CPC ......... *H04N 23/631* (2023.01); *G06F 3/0482* (2013.01); *G06F 3/04845* (2013.01); *H04N 23/611* (2023.01)

(58) Field of Classification Search
CPC .... H04N 23/631; H04N 23/611; H04N 23/62; H04N 23/675; G06F 3/0482;
(Continued)

(56) References Cited

U.S. PATENT DOCUMENTS

2015/0022682 A1   1/2015 Seita
2017/0155825 A1   6/2017 Yoshikawa
(Continued)

FOREIGN PATENT DOCUMENTS

CN    105338192 A    2/2016
CN    106817536 A    6/2017
(Continued)

*Primary Examiner* — Marly S Camargo
(74) *Attorney, Agent, or Firm* — Canon U.S.A., Inc. IP Division

(57) ABSTRACT

An electronic apparatus includes an imaging unit configured to image a subject, an eyepiece portion configured to visually recognize an image of the subject, a display unit configured to enable visual recognition via the eyepiece portion, a detection unit configured to detect a gaze point by a line-of-sight of a user looking at the display unit, and a control unit configured to, in a state where selected position specification based on the gaze point is performed, perform control, upon performance of a move operation for movement while in contact with an operation surface of an operation unit, to move a selected position displayed on the display unit from a position based on the gaze point to a position corresponding to a direction and an amount of movement of the move operation.

22 Claims, 10 Drawing Sheets

(51) Int. Cl.
    *G06F 3/04845*    (2022.01)
    *H04N 23/611*     (2023.01)
    *H04N 23/62*      (2023.01)
    *H04N 23/67*      (2023.01)
    *G03B 13/02*      (2021.01)
    *G03B 17/20*      (2021.01)
    *G02B 7/28*       (2021.01)

(58) Field of Classification Search
    CPC ....... G06F 3/04845; G02B 7/28; G03B 37/28;
                    G03B 13/02; G03B 13/36; G03B 17/20
    See application file for complete search history.

(56) References Cited

U.S. PATENT DOCUMENTS

| | | | |
|---|---|---|---|
| 2021/0278749 A1* | 9/2021 | Ito | H04N 23/631 |
| 2022/0266821 A1* | 8/2022 | Uchida | G02B 7/28 |
| 2022/0270342 A1* | 8/2022 | Shiozaki | G06V 20/20 |
| 2022/0321770 A1* | 10/2022 | Ogawa | H04N 23/611 |

FOREIGN PATENT DOCUMENTS

| | | | |
|---|---|---|---|
| CN | 109478334 A | 3/2019 | |
| JP | 2002301030 A | 10/2002 | |
| JP | 2015022208 A | 2/2015 | |
| JP | 2017103566 A | 6/2017 | |
| JP | 2018023068 A | 2/2018 | |

* cited by examiner

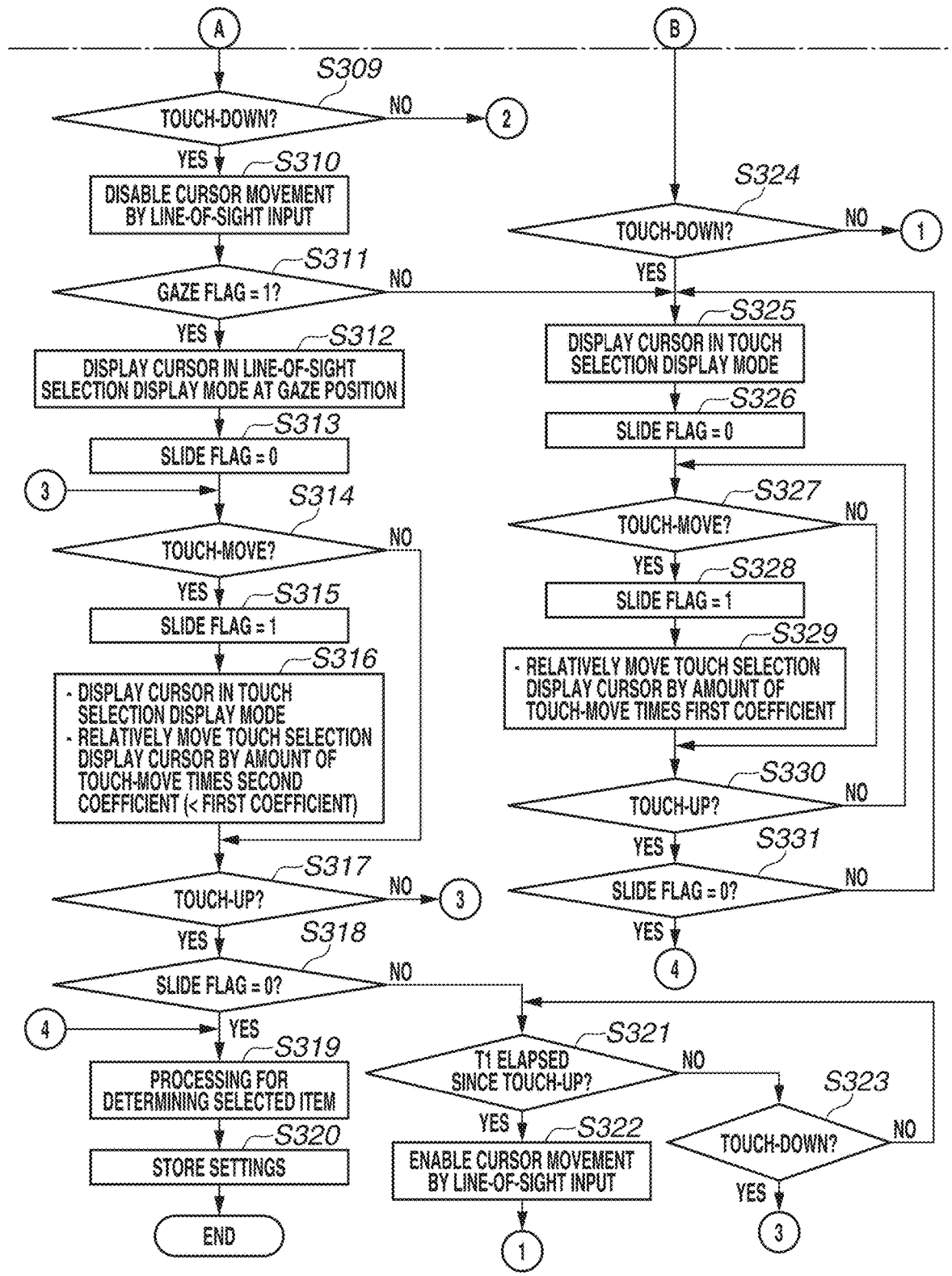

FIG.5A

| | |
|---|---|
| 500 — WHITE BALANCE | AWB |
| MWB IMAGE SELECTION | |
| WB CORRECTION/BKT SETTING | 0,0/±0 |
| 501 — PICTURE STYLE | STANDARD |
| NOISE REDUCTION FOR EXPOSURE IN LONG-TIME IMAGE CAPTURING | OFF |
| NOISE REDUCTION IN HIGH-SENSITIVITY IMAGE CAPTURING | OFF |

FIG.5B

| | |
|---|---|
| WHITE BALANCE | AWB |
| MWB IMAGE SELECTION | |
| WB CORRECTION/BKT SETTING | 0,0/±0 |
| PICTURE STYLE | STANDARD |
| 502 — NOISE REDUCTION FOR EXPOSURE IN LONG-TIME IMAGE CAPTURING | OFF |
| NOISE REDUCTION IN HIGH-SENSITIVITY IMAGE CAPTURING | OFF |

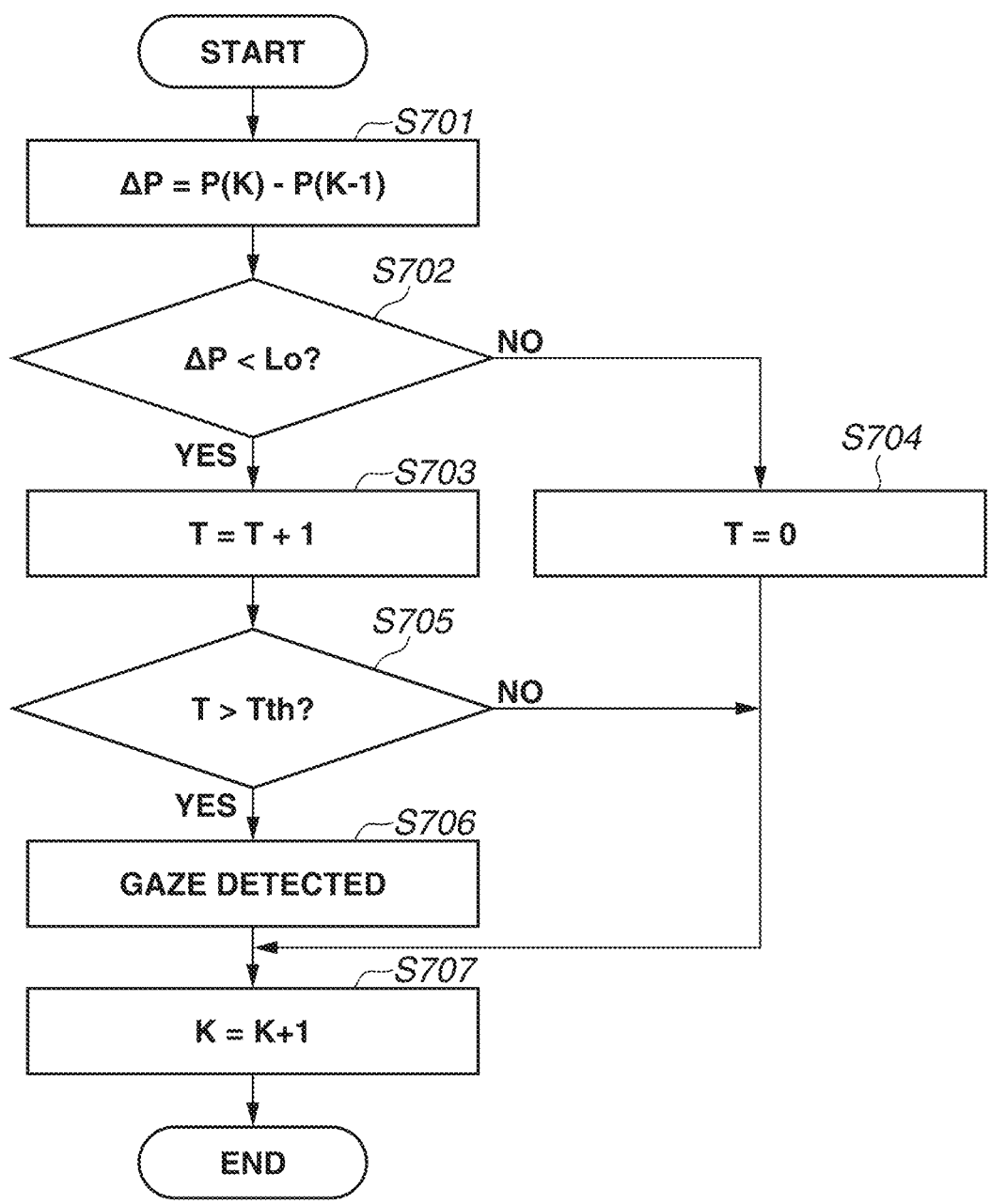

FIG.8
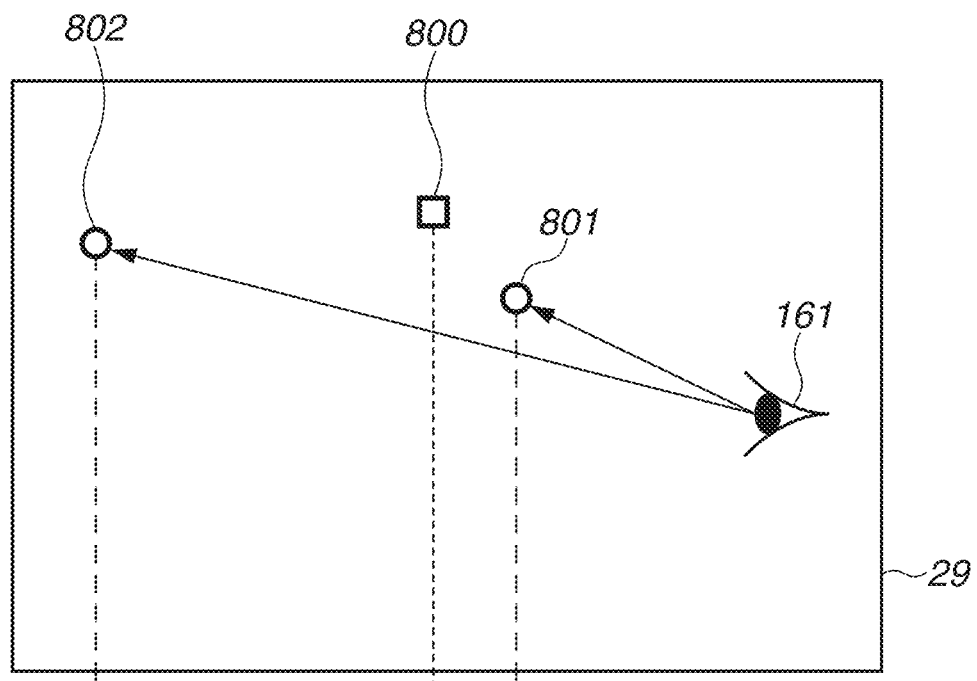
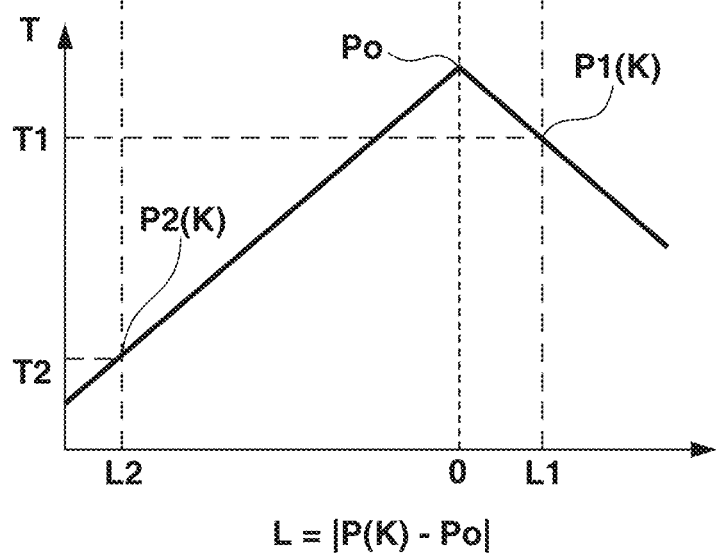
$L = |P(K) - Po|$

ELECTRONIC APPARATUS, METHOD FOR CONTROLLING THE SAME, AND STORAGE MEDIUM

CROSS-REFERENCE TO RELATED APPLICATIONS

This application is a Continuation of International Patent Application No. PCT/JP2020/021324, filed May 29, 2020, which claims the benefit of Japanese Patent Application No. 2019-112315, filed Jun. 17, 2019, both of which are hereby incorporated by reference herein in their entirety.

BACKGROUND OF THE INVENTION

Field of the Invention

The present invention relates to an electronic apparatus that can be operated by the line-of-sight, and a method for controlling the electronic apparatus.

Background Art

There has conventionally been proposed a camera that detects the direction of the line-of-sight of a photographer as a user, detects which region (position) in the finder field the photographer is observing, and controls an imaging function such as automatic focus adjustment. Patent Document 1 (PTL 1 described below) discloses a technique for detecting the user's line-of-sight position while the user is looking in the finder, and displaying an automatic focus (AF) frame at the line-of-sight position. If the AF frame corresponding to the line-of-sight position is not the position intended by the user, operating an operation member of the camera body operable in the eight directions enables moving the displayed AF frame.

With the technique disclosed in Patent Document 1, however, if the user attempts to move an AF frame displayed at the line-of-sight position by operating an operation member such as arrow keys, a number of operations need to be performed to move the AF frame when there are many focusing points. This requires time to move the AF frame to the position intended by the user.

CITATION LIST

Patent Literature

PTL 1: Japanese Patent Laid-Open No. 2015-22208

SUMMARY OF THE INVENTION

The present invention is directed to more quickly and more accurately moving a selected position to a position intended by the user.

In order to solve the above-described issue, according to an aspect of the present invention, an electronic apparatus includes an imaging unit configured to image a subject, an eyepiece portion configured to visually recognize an image of the subject, a display unit configured to enable visual recognition via the eyepiece portion, a detection unit configured to detect a gaze point by a line-of-sight of a user looking at the display unit, and a control unit configured to, in a state where selected position specification based on the gaze point is performed, perform control, upon performance of a move operation for movement while in contact with an operation surface of an operation unit, to move a selected position displayed on the display unit from a position based on the gaze point to a position corresponding to a direction and an amount of movement of the move operation.

Further features of the present invention will become apparent from the following description of exemplary embodiments with reference to the attached drawings.

BRIEF DESCRIPTION OF THE DRAWINGS

FIGS. 3A and 3B are a control flowchart illustrating cursor display and movement, and determination processing according to the present exemplary embodiment.

FIG. 5A illustrates an example cursor display on a setting menu screen according to the present exemplary embodiment.

FIG. 5B illustrates another example cursor display on the setting menu screen according to the present exemplary embodiment.

FIG. 7 is a flowchart for determining whether gaze is detected according to the present exemplary embodiment.

FIG. 8 illustrates threshold value change control for gaze determination time according to the present exemplary embodiment.

DESCRIPTION OF THE EMBODIMENTS

Preferable exemplary embodiments of the present invention will be described below with reference to the accompanying drawings.

Figure 1A:
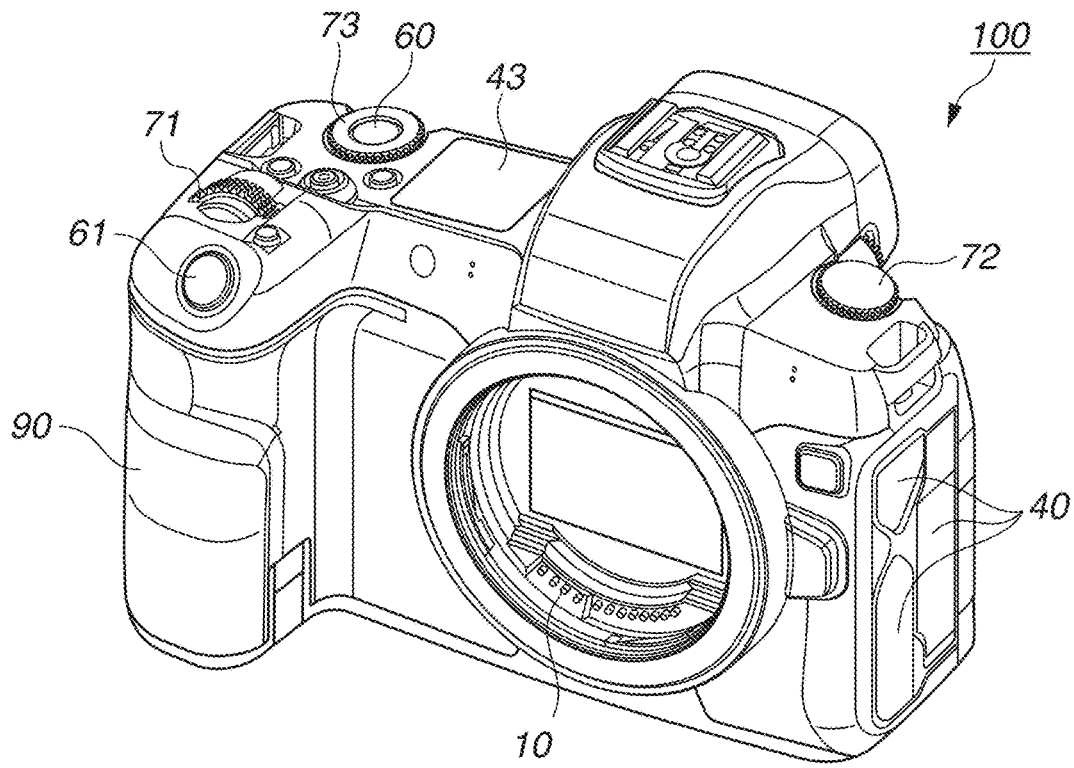
FIG. 1A is an external view illustrating a digital camera according to the present exemplary embodiment.
Figure 1B:
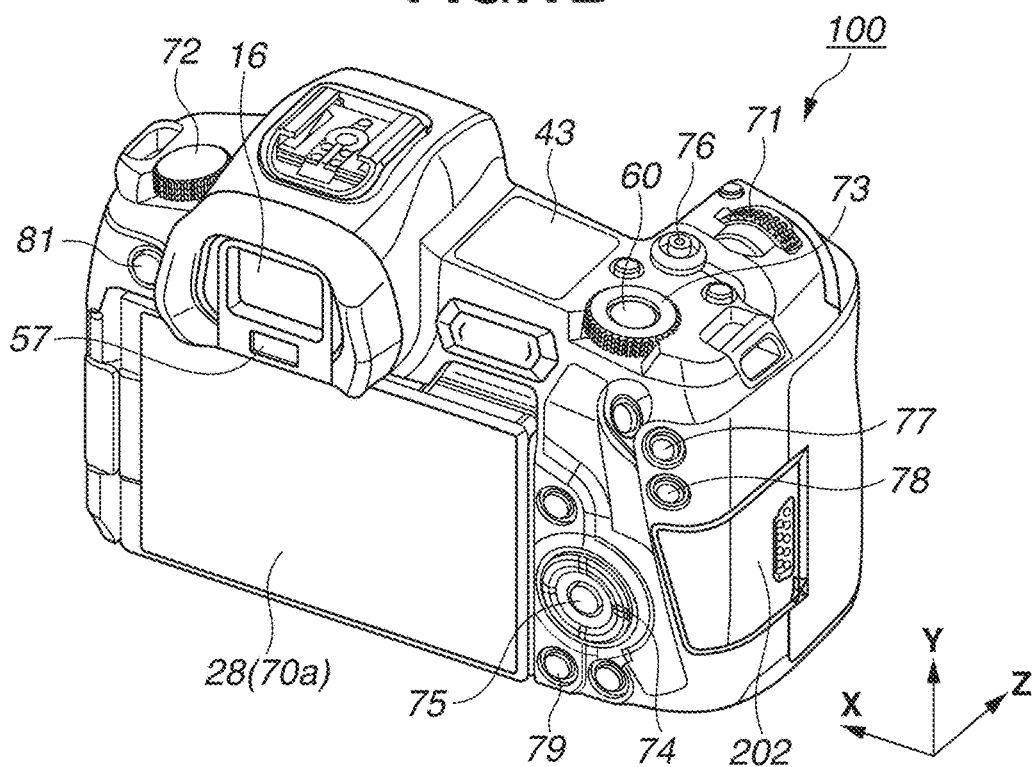
FIG. 1B is another external view illustrating the digital camera according to the present exemplary embodiment.

FIGS. 1A and 1B are external views illustrating a digital camera 100 as an example of an apparatus according to the present invention. FIG. 1A is a perspective view illustrating the front face of the digital camera 100, and FIG. 1B is a perspective view illustrating the rear face of the digital camera 100. Referring to FIGS. 1A and 1B, a display unit 28 disposed on the rear face of the digital camera displays images and various kinds of information. A touch panel 70a detects a touch operation on the display surface (operation surface) of the display unit 28. An extra-finder display unit 43 disposed on the top face of the digital camera displays the shutter speed, aperture value, and other various setting values of the camera. A shutter button 61 is an operation member for issuing a photographing instruction. A mode selection switch 60 is an operation member for selecting various modes. Terminal covers 40 protect connectors (not illustrated) for connecting a connection cable from an external apparatus to the digital camera 100. A main electronic dial 71 included in an operation unit 70 is a rotary operation member that is turned to change the setting values of the shutter speed and aperture value. A power switch 72 is an operation member that turns power of the digital camera 100 ON and OFF. A sub electronic dial 73 included in the operation unit 70 is a rotary operation member that moves a selection frame and feeds images. A cross key 74 included in the operation unit 70 has buttons that can be pressed in four different directions. The cross key 74 enables the operation corresponding to a pressed portion. A SET button 75 included in the operation unit 70 is a push button mainly used to determine a selected item. A moving image button 76 is used to issue instructions for starting and stopping moving image capturing (recording). An automatic exposure (AE) lock button 77 included in the operation unit 70 is pressed in the shooting standby state to fix the exposure condition. An enlargement button 78 included in the operation unit 70 is an operation button that turns the enlargement mode ON or OFF in the live view display in the image capturing mode. After tuning ON the enlargement mode, the live view image can be enlarged or reduced by operating the main electronic dial 71. In the playback mode, the enlargement button 78 enlarges the playback image to increase the magnification. A playback button 79 included in the operation unit 70 switches between the image capturing mode and the playback mode. When the user presses the playback button 79 in the image capturing mode, the digital camera 100 enters the playback mode making it possible to display the latest image of images recorded in a recording medium 200, on the display unit 28. A menu button 81 included in the operation unit 70 is pressed to display on the display unit 28 menu screens to perform various settings. The user can intuitively perform various settings by using the menu screen displayed on the display unit 28, the cross key 74, and the SET button 75.

A communication terminal 10 is used by the digital camera 100 to communicate with a lens unit 150 (described below) attachable to and detachable from the camera. An eyepiece portion 16 of the eyepiece finder (look-in finder) enables the user to visually recognize the electronic image displayed in an Electric View Finder (EVF) 29 inside the finder. When an optical image of a subject can be acquired through the lens unit 150, the user is able to visually recognize an optical image by using the internal optical finder through the eyepiece portion 16. The eye approach detection unit 57 is an eye approach detection sensor that detects whether the photographer's eye is in contact with the eyepiece portion 16. The cover 202 covers the slot that stores the recording medium 200. A grip portion 90 has a shape that is easy to grip with the right hand when the user holds the digital camera 100. The shutter button 61 and the main electronic dial 71 are disposed at positions in which operation is possible by the forefinger of the right hand in a state where the user holds the digital camera 100 by gripping the grip portion 90 with the little finger, the third finger, and the middle finger of the right hand. The sub electronic dial 73 is disposed at a position in which operation is possible by the thumb of the right hand in the same state.

Figure 2:
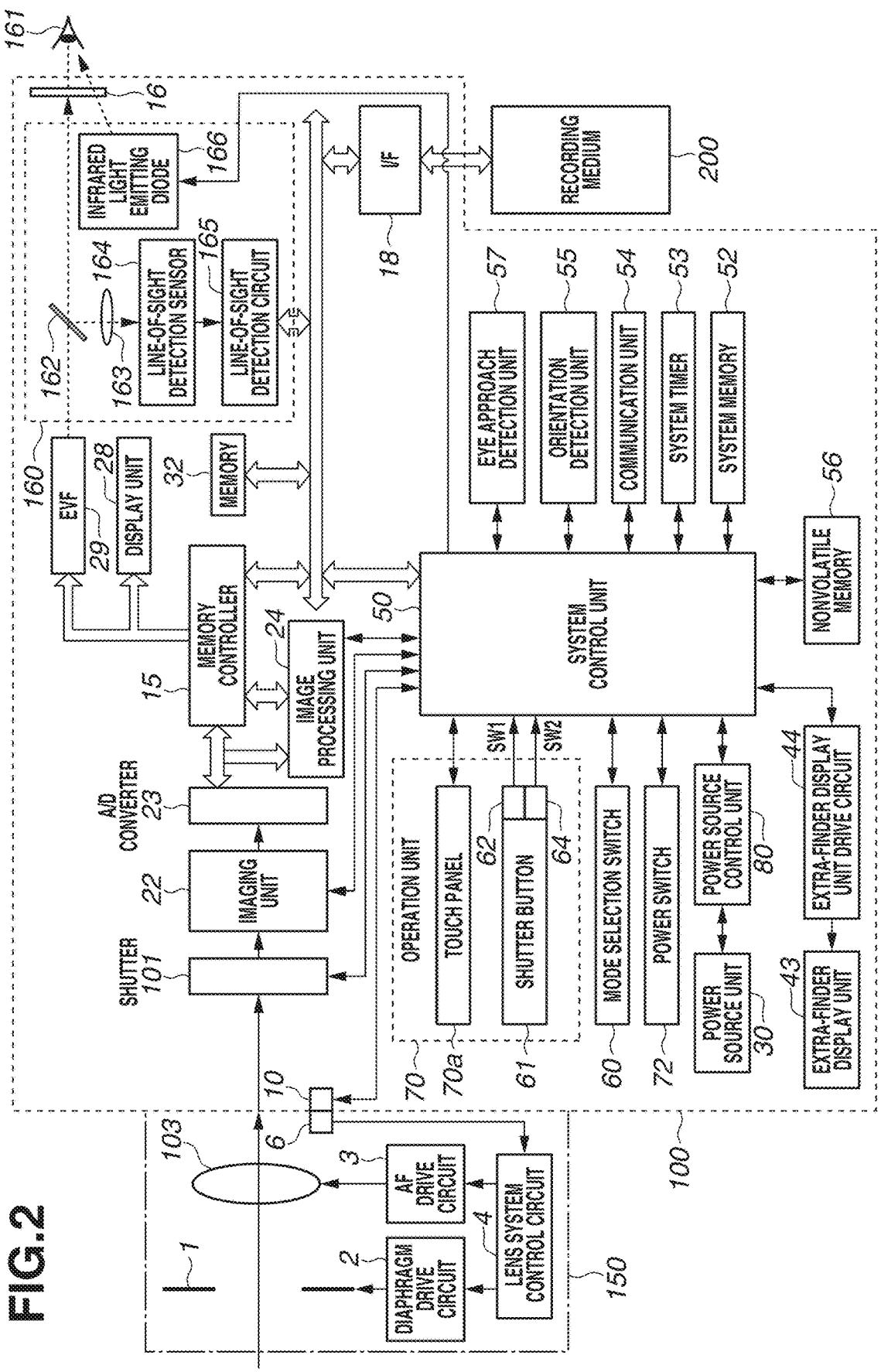
FIG. 2 is a block diagram illustrating a configuration of the digital camera according to the present exemplary embodiment.

FIG. 2 is a block diagram illustrating an example configuration of the digital camera 100 according to the present exemplary embodiment. Referring to FIG. 2, the lens unit 150 mounts an interchangeable imaging lens. Although a lens 103 normally includes a plurality of lenses, FIG. 2 illustrates a single lens as the lens 103 for simplification. A communication terminal 6 is used by the lens unit 150 to communicate with the digital camera 100. The lens unit 150 communicates with a system control unit 50 via the communication terminal 6 and the above-described communication terminal 10. An internal lens system control circuit 4 controls a diaphragm 1 via a diaphragm drive circuit 2, and focuses on the subject by displacing the lens 103 via an Automatic Focus (AF) drive circuit 3.

A shutter 101 is a focal plane shutter that enables freely controlling the exposure time of an imaging unit 22 under the control of the system control unit 50.

The imaging unit 22 is an image sensor including a charge coupled device (CCD) or complementary metal oxide semiconductor (CMOS) sensor that converts an optical image into an electrical signal. An analog-to-digital (A/D) converter 23 converts the analog signal output from the imaging unit 22 into a digital signal.

An image processing unit 24 subjects the data from the A/D converter 23 or the data from a memory controller 15 (described below) to predetermined pixel interpolation, resizing processing such as reduction, and color conversion processing. The image processing unit 24 also subjects captured image data to predetermined calculation processing. The system control unit 50 performs exposure control and distance measurement control based on the calculation result obtained by the image processing unit 24. This enables performing AF processing, automatic exposure (AE) processing, and electronic flash (EF) (preliminary flash emission) processing based on the through-the-lens (TTL) method. The image processing unit 24 also subjects the captured image data to predetermined calculation processing and performs TTL-based automatic white balance (AWB) processing based on the obtained calculation result.

The memory controller 15 controls data communication between the A/D converter 23, the image processing unit 24, and a memory 32. The output data from the A/D converter 23 is written in the memory 32 via the image processing unit 24 and the memory controller 15, or directly written in the memory 32 via the memory controller 15. The memory 32 stores image data captured by the imaging unit 22 and then converted into digital data by the A/D converter 23, and image data to be displayed on the display unit 28 and the EVF 29. The memory 32 is provided with a sufficient storage capacity to store a predetermined number of still images, and moving images and sound for a predetermined time period.

The memory 32 also serves as an image display memory (video memory). The display image data written in the memory 32 is displayed on the display unit 28 and the EVF 29 via the memory controller 15. The display unit 28 and the EVF 29 display data on a liquid crystal display (LCD) or an organic electroluminescence (EL) display according to the signal from the memory controller 15. The data A/D-converted by the A/D converter 23 and then stored in the memory 32 is successively transferred to the display unit 28 or the EVF 29 to be displayed thereon, thus performing live view display (LV display). Hereinafter, an image displayed in the live view is referred to as a live view image (LV image).

An infrared light emitting diode 166, a light emitting element for detecting the user's line-of-sight position in the in-finder screen, irradiates a user's eyeball (eye) 161 in contact with the eyepiece portion 16 with infrared light. The infrared light emitted from the infrared light emitting diode 166 is reflected by the eyeball (eye) 161, and the reflected infrared light reaches a dichroic mirror 162. The dichroic mirror 162 reflects only infrared light and transmits visible light. The reflected infrared light with the optical path changed forms an image on the imaging plane of a line-of-sight detection sensor 164 via a imaging lens 163. The imaging lens 163 is an optical member that configures a line-of-sight detection optical system. The line-of-sight detection sensor 164 includes an imaging device such as a CCD image sensor.

The line-of-sight detection sensor 164 electrically converts the incident reflected infrared light into an electrical signal and outputs the electrical signal to a line-of-sight detection circuit 165. The line-of-sight detection circuit 165 including at least one processor detects the user's gaze position from the image or movement of the user's eyeball (eye) 161 based on the output signal of the line-of-sight detection sensor 164, and outputs detection information to the system control unit 50. In this way, the dichroic mirror 162, the imaging lens 163, the line-of-sight detection sensor 164, the infrared light emitting diode 166, and the line-of-sight detection circuit 165 configure a line-of-sight detection unit 160.

According to the present invention, the line-of-sight is detected based on a method called the cornea reflection method by the line-of-sight detection block 160. The cornea reflection method detects the orientation and position of the line-of-sight based on the positional relation between the reflected light (the infrared light emitted from the infrared light emitting diode 166 and reflected by the cornea of the eyeball (eye) 161 and the pupil of the eyeball (eye) 161. Other various methods for detecting the orientation and position of the line-of-sight include the sclera reflection method that utilizes the difference in light reflectance between black and white eye regions. Other methods for detecting the line-of-sight are also applicable as long as the orientation and position of the line-of-sight can be detected.

The liquid crystal extra-finder liquid crystal display unit 43 displays the shutter speed, aperture value, and other various setting values of the camera via an extra-finder display unit drive circuit 44.

A nonvolatile memory 56 is an electrically erasable recordable memory such as a flash read only memory (ROM). Constants and programs for operations of the system control unit 50 are stored in the nonvolatile memory 56. Programs stored in the nonvolatile memory 56 refer to programs for executing various flowcharts (described below) according to the present exemplary embodiment.

The system control unit 50 including at least one processor or circuit controls the entire digital camera 100. Each piece of processing according to the present exemplary embodiment (described below) is implemented when the system control unit 50 executes the above-described programs recorded in the nonvolatile memory 56. A system memory 52 is, for example, a random access memory (RAM). Constants and variables for operations of the system control unit 50 and programs read from the nonvolatile memory 56 are loaded into the system memory 52. The system control unit 50 also performs display control by controlling the memory 32 and the display unit 28.

A system timer 53 is a time measurement unit that measures time used for various kinds of control and time of a built-in clock.

The mode selection switch 60, a first shutter switch 62, a second shutter switch 64, and the operation unit 70 are operation members for inputting various operation instructions to the system control unit 50. The mode selection switch 60 switches the operation mode of the system control unit 50 between the still image capturing mode, the moving image capturing mode, and the like. The still image capturing mode includes an automatic image capturing mode, automatic scene determination mode, manual mode, aperture priority mode (Av mode), shutter speed priority mode (Tv mode), and program AE mode (P mode). The still image capturing mode also includes various scene modes including imaging settings for each photographing scene, and a custom mode. The mode selection switch 60 enables the user to directly select any one of these modes. Alternatively, the user may once select an image capturing mode list screen by using the mode selection switch 60, select any one of the plurality of displayed modes, and then change the mode by using other operation members. Likewise, the moving image capturing mode may also include a plurality of modes.

The first shutter switch 62 turns ON in the middle of the operation of the shutter button 61 provided on the digital camera 100, what is called a half depression (imaging preparation instruction), to generate a first shutter switch signal SW1. The first shutter switch signal SW1 causes the system control unit 50 to start imaging preparation operations such as the AF processing, AE processing, AWB processing, and EF processing.

The second shutter switch 64 turns ON upon completion of the operation of the shutter button 61, what is called a full depression (photographing instruction), to generate a second shutter switch signal SW2. Upon issuance of the second shutter switch signal SW2, the system control unit 50 starts a series of operations for imaging processing ranging from signal reading from the imaging unit 22 to captured image writing as an image file in the recording medium 200.

The operation unit 70 includes various operation members as input members for receiving operations from the user. The operation unit 70 includes at least the following operation members: the shutter button 61, the touch panel 70a, the main electronic dial 71, the power switch 72, the sub electronic dial 73, the cross key 74, the SET button 75, the moving image button 76, the AE lock button 77, the enlargement button 78, the playback button 79, and the menu button 81.

A power source control unit 80 including a battery detection circuit, a direct-current to direct-current (DC-DC) converter, and a switch circuit for selecting a block to be supplied with power detects the presence or absence of a battery, the battery type, and the remaining battery capacity. The power source control unit 80 also controls the DC-DC converter based on the detection result and an instruction of the system control unit 50 to supply required voltages to the recording medium 200 and other components for required time periods. A power source unit 30 includes a primary battery (such as an alkaline battery or lithium battery), a secondary battery (such as a NiCd battery, NiMH battery, or lithium ion battery), and an alternating current (AC) adaptor.

A recording medium interface (I/F) 18 is an interface to the recording medium 200 such as a memory card or a hard disk. The recording medium 200, such as a memory card for recording captured images, includes a semiconductor memory or a magnetic disk.

A communication unit 54 performs wireless or wired cable connection to transmit and receive image and audio signals. The communication unit 54 is connectable with a wireless Local Area Network (LAN) and the Internet. The communication unit 54 can communicate with an external apparatus through Bluetooth® and Bluetooth® Low Energy. The communication unit 54 is capable of transmitting images (including the live view image) captured by the imaging unit 22 and images stored in the recording medium 200, and receiving images and other various kinds of information from an external apparatus.

An orientation detection unit 55 detects the orientation of the digital camera 100 in the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can append the orientation information corresponding to the orientation detected by the orientation detection unit 55 to the image file of the image captured by the imaging unit 22 or rotate the image before recording. An acceleration sensor or a gyroscope sensor can be used as the orientation detection unit 55. Motions of the digital camera 100 (pan, tilt, raising, and stand still) can also be detected by using an acceleration sensor or a gyroscope sensor as the orientation detection unit 55.

The eye approach detection unit 57 is an eye approach detection sensor that detects the state where the eye (object) 161 is coming closer to (coming into contact with) the eyepiece portion 16 of the finder (eye-on state) and the state where the eye 161 is being detached from (coming out of contact with) the eyepiece portion 16 of the finder (eye-off state) (approach detection). This method is referred to as approach detection. The system control unit 50 turns display of the display unit 28 and the EVF 29 ON (display state) or OFF (undisplay state) according to the state detected by the eye approach detection unit 57. More specifically, at least when the digital camera 100 is in the shooting standby state and when automatic changeover setting is made as the changeover setting for the display destination of the image to be displayed through the imaging unit 22, the digital camera 100 performs display control in the following way. In the eye-off state, the display unit 28 is set as the display destination, i.e., the display of the display unit 28 is turned ON, and the display of the EVF 29 is turned OFF. In the eye-on state, the EVF 29 is set as the display destination, i.e., the display of the EVF 29 is turned ON, and the display of the display unit 28 is turned OFF. The eye approach detection unit 57 can use, for example, an infrared light proximity sensor that detects a state where a certain object is coming closer to the eyepiece portion 16 of the finder incorporating the EVF 29. When an object comes close to the eyepiece portion 16, infrared light emitted from the light emitting portion (not illustrated) of the eye approach detection unit 57 is reflected and then received by the light receiving portion (not illustrated) of the infrared light proximity sensor. The eye approach detection unit 57 can also determine the distance (eye approach distance) from the eyepiece portion 16 to the object based on the amount of the received infrared light. In this way, the eye approach detection unit 57 performs eye approach detection for detecting the proximity distance from the object to the eyepiece portion 16. According to the present exemplary embodiment, the light emitting portion and the light receiving portion of the eye approach detection unit 57 are devices different from the infrared light emitting diode 166 and the line-of-sight detection sensor 164, respectively. However, the infrared light emitting diode 166 may also serve as the light emitting portion of the eye approach detection unit 57, and the line-of-sight detection sensor 164 may serve as the light receiving portion of the eye approach detection unit 57. When an object in the eye-off state (non-approaching state) has come closer to the eyepiece portion 16 at a predetermined distance or shorter, the eye approach detection unit 57 determines the eye-on state. When an object in the eye-on state (approaching state) has been detached from the eyepiece portion 16 by a predetermined distance or longer, the eye approach detection unit 57 determines the eye-off state. The threshold value for detecting the eye-on state and the threshold value for detecting the eye-off state may be differentiated, for example, by providing a hysteresis. Once the eye-on state is detected, the eye-on state lasts until the eye-off state is detected. Once the eye-off state is detected, the eye-off state lasts until the eye-on state is detected. The infrared light proximity sensor is an example of the eye approach detection unit 57. Other sensors capable of detecting the approach of an eye or object (with which the eye-on state can be recognized) may be employed as the eye approach detection unit 57.

The system control unit 50 can detect the following operations and states based on the output from the line-of-sight detection block 160.

A state where a new line-of-sight of the user's eye put on the eyepiece portion 16 is input (detected), i.e., the user starts the line-of-sight input A state where the user's eye put on the eyepiece portion 16 is being subjected to the line-of-sight input A state where the user's eye put on the eyepiece portion 16 is gazing at a particular point, i.e., the system control unit 50 starts to detect a gaze position (gaze point) by the user A state where the user's eye put on the eyepiece portion 16 turns the line-of-sight, i.e., the user ends the line-of-sight input A state where the user's eye put on the eyepiece portion 16 is not being subjected to the line-of-sight input "Gaze" described above refers to a state where the user's line-of-sight position does not exceed a predetermined amount of movement within a predetermined time period. The predetermined time may be time that can be set by the user or predetermined fixed time, or may change according to the distance between the adjacent line-of-sight position and the current line-of-sight position.

The touch panel 70a and the display unit 28 can be integrally configured. For example, the touch panel 70a is configured so that the light transmissivity does not disturb the display of the display unit 28, and is attached to the upper layer of the display surface of the display unit 28. The input coordinates of the touch panel 70a are associated with the display coordinates on the display screen of the display unit 28. This enables providing a graphical user interface (GUI) that allows the user to directly operate the screen displayed on the display unit 28. The system control unit 50 can detect the following operations on the touch panel 70a and the following states of the touch panel 70a:

An operation to start touching the touch panel 70a with the finger or pen that has been out of contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen that has been in contact with the touch panel 70a from the touch panel 70a to end touching (hereinafter referred to as a "touch-up")

A state where the finger or pen is out of contact with the touch panel 70a (hereinafter referred to as a "touch-off")

When a touch-down is detected, a touch-on is also detected at the same time. After a touch-down, a touch-on is normally kept being detected until a touch-up is detected. A touch-move is detected in a state where a touch-on is detected. Even when a touch-on is detected, a touch-move is not detected if the touch position remains unchanged. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. More specifically, the touch panel 70a can input position coordinates. Based on the notified information, the system control unit 50 determines what kind of operation (touch operation) has been performed on the touch panel 70a. For a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation has been performed. An operation to quickly move the finger over a certain distance while in contact with the touch panel 70a and then detach the finger is referred to as a flick. In other words, a flick is an operation to quickly flip the surface of the touch panel 70a with the finger. When a touch-move at a predetermined speed or higher over a predetermined distance or longer is detected and a subsequent touch-up is detected, the system control unit 50 can determine that a flick has been performed (a flick has been performed following a slide operation). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of diverse types including the resistance film type, capacitance type, surface elastic wave type, infrared type, electromagnetic induction type, image recognition type, and optical sensor type. A touch operation is detected when the finger or pen comes into contact with the touch panel 70a or when the finger or pen comes close to the touch panel 70a depending on the type, and either type is applicable.

When a touch-move operation is performed in the eye-on state, the user can set the method for specifying the position index position corresponding to the touch-move operation to the absolute position specification or the relative position specification. For example, if the position index is the AF frame in the absolute position specification, when the user touches the touch panel 70a, the AF position associated with the touched position is set. More specifically, the position coordinates where the touch operation is performed are associated with the position coordinates of the display unit 28. On the contrary, in the relative position specification, the position coordinates where the touch operation is performed are not associated with the position coordinates of the display unit 28. In the relative position specification, the system control unit 50 moves the touch position by the distance corresponding to the amount of movement of the touch-move in the moving direction of the touch-move from the currently set AF position, regardless of the touch-down position on the touch panel 70a. More specifically, the AF position does not move when a touch-down is performed.

The present exemplary embodiment will be described below centering on processing for cursor display and movement control through a line-of-sight input operation and a touch input operation on the digital camera 100.

Figure 3A:
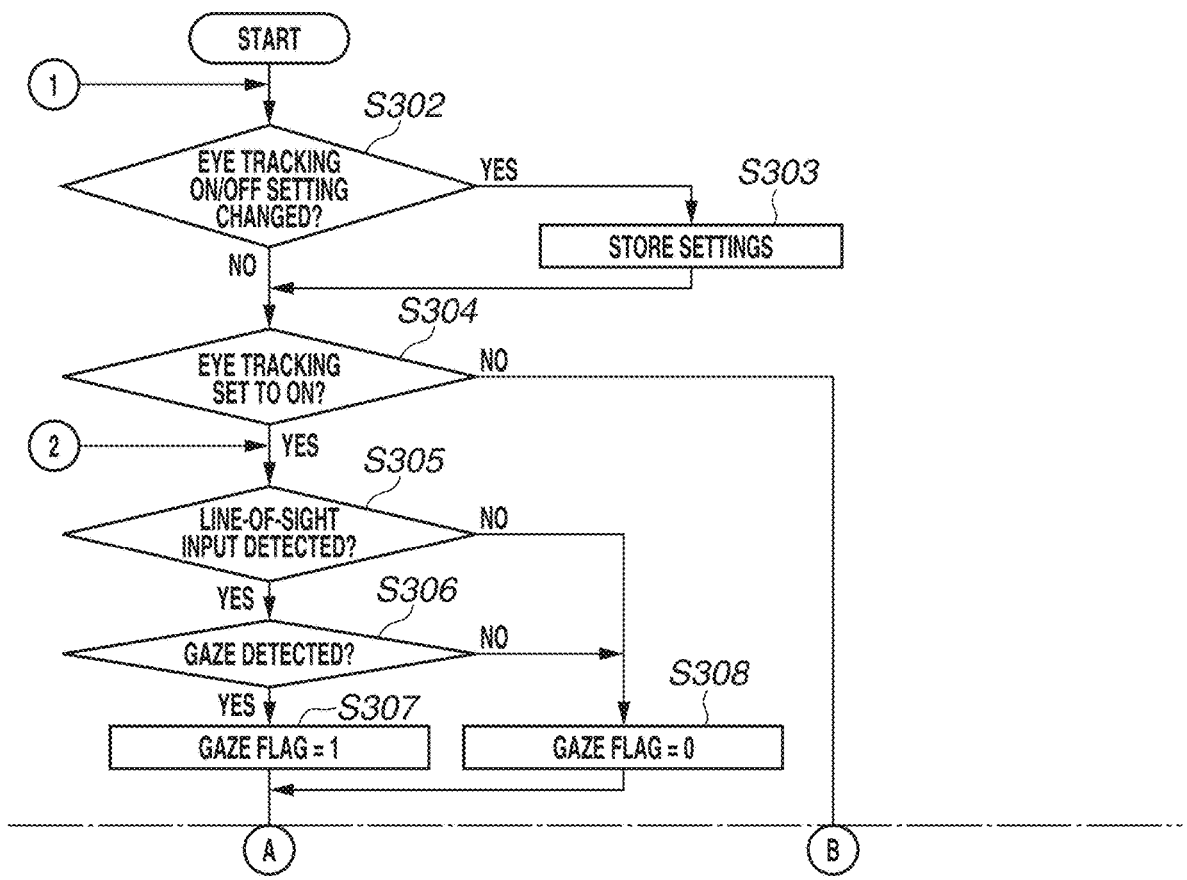

FIG. 3 is a flowchart illustrating cursor position movement control in a setting menu screen through the line-of-sight input and a touch operation. This control processing is implemented when the system control unit 50 loads a program stored in the nonvolatile memory 56 into the system memory 52 and then executes the program. The flowchart illustrated in FIG. 3 is started when the digital camera 100 is activated in the image capturing mode, and the user is looking in the finder in the shooting standby state, i.e., when the eye is put on the eyepiece portion 16 (eye-on state). According to the present exemplary embodiment, the user operates the touch panel 70a while looking in the finder to select or change a setting menu item.

Figure 4:
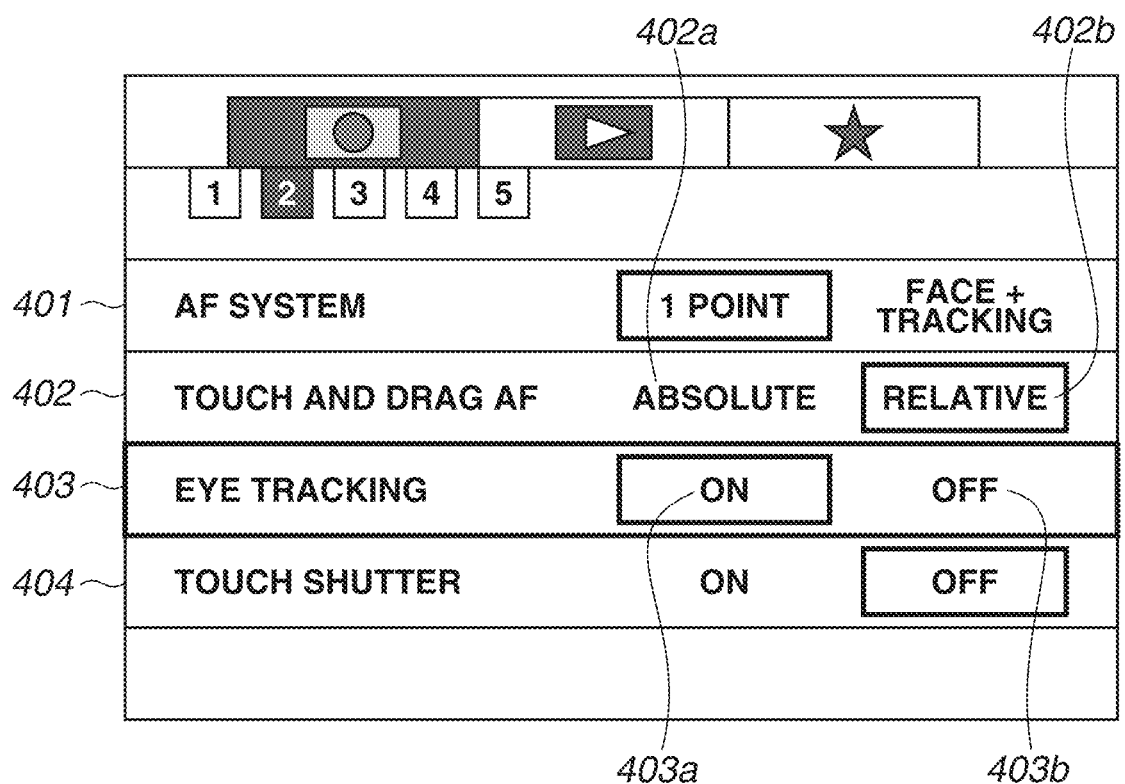
FIG. 4 illustrates an example display of an automatic focus (AF)-related setting screen according to the present exemplary embodiment.

In step S302, the system control unit 50 determines whether the user has changed the setting for the eye tracking on the digital camera 100. When the user has changed the setting (YES in step S302), the processing proceeds to step S303. On the other hand, when the user leaves the setting unchanged (NO in step S302), the processing proceeds to step S304. More specifically, the system control unit 50 determines whether the user has performed an operation for displaying the menu screen of the digital camera 100 illustrated in FIG. 4 and an operation for changing a setting item 403 related to the line-of-sight input. FIG. 4 illustrates a setting menu screen related to imaging displayed in the EVF 29 or the display unit 28. Setting items 401 to 404 are displayed in the setting menu screen. Of these, the setting item 403 relates to the line-of-sight input. The line-of-sight input refers to a function of the user moving the cursor and the AF frame by using the line-of-sight. An eye tracking can be set to ON or OFF. When the eye tracking is set to ON, the user can perform operations for moving the cursor and the AF frame by using the line-of-sight. When the eye tracking is set to OFF, the user cannot perform operations for moving the cursor and the AF frame by using the line-of-sight. Selecting a setting item 403a sets the eye tracking to ON, and selecting a setting item 403b sets the eye tracking to OFF. FIG. 4 illustrates that the eye tracking setting is set to ON. The setting item 403 is selected by the cursor represented by a cursor 500 illustrated in FIG. 5A. In this embodiment, that the eye tracking is set to ON means that the line-of-sight detection block 160 is ON, and that the eye tracking is set to OFF means that the line-of-sight detection block 160 is OFF.

In step S303, the system control unit 50 stores settings changed in step S302 in the nonvolatile memory 56.

In step S304, the system control unit 50 refers to the nonvolatile memory 56 to determine whether the eye tracking setting stored in step S303 is ON. When the eye tracking is set to ON (YES in step S304), the processing proceeds to step S305. On the other hand, when the eye tracking is set to OFF (NO in step S304), the processing proceeds to step S324.

In step S305, the system control unit 50 determines whether the line-of-sight input is detected. When the line-of-sight input is detected, i.e., when the line-of-sight detection block 160 detects the user's line-of-sight (YES in step S305), the processing proceeds to step S306. On the other hand, when the line-of-sight input is not detected, i.e., when the line-of-sight detection block 160 does not detect the user's line-of-sight (NO in step S305), the processing proceeds to step S308. When the line-of-sight input is detected, the system control unit 50 measures time elapsed since the timing when the line-of-sight input was started. For example, the line-of-sight detection block 160 detects the line-of-sight position and sends the detected line-of-sight position to the system control unit 50 at 30-ms intervals. The system control unit 50 determines whether the user is largely moving the line-of-sight or gazing at a particular position, based on the line-of-sight position and the measured time. Gaze will be described below in step S306.

In step S306, the system control unit 50 determines whether the user is gazing at a particular position. The system control unit 50 determines that the user is gazing at a particular position when the amount of movement of the line-of-sight position in a predetermined time is equal to or less than a threshold value, based on the line-of-sight position and the measured time. For example, the system control unit 50 determines that the user is gazing at a particular position when the amount of movement of the line-of-sight position is equal to or less than the threshold value within 120 ms. When the user is gazing at a particular position (YES in step S306), the processing proceeds to step S307. When the amount of movement of the line-of-sight position is equal to or larger than the threshold value within 120 ms, i.e., when the user is largely moving the line-of-sight, based on the line-of-sight position and the measured time, the system control unit 50 determines that the user is not gazing at a particular position (NO in step S306). Then, the processing proceeds to step S308. In this case, a gaze is taken as a condition for determining the line-of-sight position intended by the user with respect to the movement of the cursor display position by the line-of-sight input. However, the user's blink or audio instruction may also be taken as the condition. The system control unit 50 may move the cursor according to the position where the line-of-sight is detected even without a gaze (this means that steps S306 to S308 and S311 may be omitted). Although a measurement time of 120 ms is set to determine a gaze as a specific example, this measurement time may be preset or arbitrarily set by the user. The measurement time may be changed according to the relation between the position at which the user is currently gazing and the gaze position detected 120 ms before. Processing for changing the measurement time according to the above-described positional relation for the gaze position will be described below with reference to FIG. 8.

In step S307, the system control unit 50 sets a gaze flag to 1 and stores the gaze flag in the system memory 52. When the system control unit 50 determines that the user is gazing at a particular position in step S306, the system control unit 50 set the gaze flag to 1.

In step S308, the system control unit 50 sets the gaze flag to 0 and stores the gaze flag in the system memory 52. When the system control unit 50 determines that the user is not gazing at a particular position in step S306, the system control unit 50 sets the gaze flag to 0.

In step S309, the system control unit 50 determines whether a touch-down on the touch panel 70a is detected. When a touch-down is detected (YES in step S309), the processing proceeds to step S310. On the other hand, when a touch-down is not detected (NO in step S309), the processing returns to step S305.

In step S310, the system control unit 50 temporarily disables or limits the cursor movement by the line-of-sight input. This limitation is based on the assumption that, while a touch-on is being performed by the user, the user performs a touch operation to finely adjust the cursor that has been moved by the line-of-sight input (adjust the cursor to the position intended by the user). Therefore, when a touch-down operation on the touch panel 70a is started and then being continued, the system control unit 50 does not move the cursor based on the line-of-sight even when a gaze was detected in step S306. This enables preventing the cursor that has been finely adjusted through a touch operation and moved to the position intended by the user, from being moved to another position by the line-of-sight.

In step S311, the system control unit 50 determines whether the gaze flag stored in the system memory 52 is 1. When the gaze flag is 1, i.e., when the system control unit 50 determines that the user is gazing at a particular position in step S306 (YES in step S311), the processing proceeds to step S312. On the other hand, when the gaze flag is not 1, i.e., when the system control unit 50 determines that the user is not gazing at a particular position in step S306 (NO in step S311), the processing proceeds to step S325.

In step S312, the system control unit 50 displays the cursor (indicator) in the line-of-sight selection display mode at the gaze position (gaze point) detected by the EVF 29 before or when a touch operation on the touch panel 70a was started. The cursor in the line-of-sight selection display mode (hereinafter referred to as a line-of-sight cursor) is displayed so that the user visually recognizes that the cursor (indicator) is different from the cursor in the touch selection display mode (hereinafter referred to as a touch cursor). FIGS. 5A and 5B illustrate an example of a setting menu screen. A line-of-sight cursor 501 illustrated in FIG. 5A is displayed when the user is gazing at a particular position in step S306 and is displayed when a touch-down is performed in step S309. As illustrated in FIG. 5A, in the line-of-sight cursor 501, the color of the entire selected region is differentiated from the color of the region that is not selected. This aims at avoiding the line-of-sight cursor 501 and a touch cursor 502 (described below) from confusing the user. Therefore, if the line-of-sight cursor 501 and the touch cursor 502 are displayed to be distinguishable from each other, the display form may be different from the one illustrated in FIG. 5A. For example, a display form in which a pointer is displayed at the gaze position is applicable. When the system control unit 50 confirms that the user is gazing at a particular position in step S311, it is assumed that the user intends to select a certain menu item by using the line-of-sight. This enables reducing the possibility of making the user feel troublesome even if the line-of-sight cursor 501 is displayed at the user's gaze position (gaze point). On the other hand, when the user is not gazing at a particular position, the user is not looking at a particular position but is likely to be checking the entire region in the EVF 29. Referring to the control flowchart illustrated in FIG. 3, the system control unit 50 displays the line-of-sight cursor 501 at the gaze position upon detection of a touch-down in step S309. However, the system control unit 50 may display a cursor like the cursor 500 illustrated in FIG. 5A when the control flowchart starts and the setting menu screen is opened. For the cursor 500, the color of the outer frame of the selected region is differentiated from the color of the outer frame of the deselected region. The display form of the cursor 500 may be different from the one illustrated in FIG. 5A as long as the cursor 500 is not confused with the line-of-sight cursor 501.

In step S313, the system control unit 50 set a slide flag to 0 and stores the slide flag in the system memory 52.

In step S314, the system control unit 50 determines whether a touch-move on the touch panel 70a is detected. When a touch-move is detected (YES in step S314), the processing proceeds to step S315. On the other hand, when a touch-move is not detected (NO in step S314), the processing proceeds to step S317.

In step S315, the system control unit 50 sets the slide flag to 1 and stores the slide flag in the system memory 52.

In step S316, when a touch-move on the touch panel 70a is detected in step S314, the system control unit 50 displays the touch cursor 502 instead of the line-of-sight cursor 501 displayed in step S312. The system control unit 50 subjects the touch cursor 502 in the EVF 29 to the relative position movement by a second amount that is the amount of the touch-move operation on the touch panel 70a multiplied by a second coefficient. The display form of the touch cursor 502 is differentiated from the display form of the line-of-sight cursor 501 displayed in step S312 so that the user does not confuse the position selected by the line-of-sight and the position selected by touch. As an example, the color of the outer frame of the selected region is differentiated from the color of the outer frame of the deselected region, like the touch cursor 502 illustrated in FIG. 5B. The internal portion surrounded by the outer frame is shaded and is superimposed with texts. The display form of the cursor may be different from the above-described display form as long as the user does not confuse the line-of-sight cursor 501 and the touch cursor 502. Although the display form is differentiated between the cursor 500 and the touch cursor 502, the cursor 500 and the touch cursor 502 may have a similar display form as long as the user recognizes the two cursors as cursors different from the line-of-sight cursor 501. This enables the user to visually recognize the cursor displayed in the EVF 29 without confusion. The system control unit 50 relatively move the cursor in response to a touch-move operation. Unlike the absolute position specification, the touch operation position on the touch panel 70a cannot be associated with the cursor position to be displayed in the EVF 29. The second coefficient is smaller than a first coefficient (described below). More specifically, the cursor does not largely move even with a large amount of a touch-move operation. For the same amount of a touch-move operation, the amount of cursor movement in the EVF 29 for the second amount as a product of the amount of the touch-move and the second coefficient is smaller than that for a first amount as a product of the amount of the touch-move and the first coefficient. This means that the second amount enables finer cursor movement than the first amount.

In step S317, the system control unit 50 determines whether a touch-up from the touch panel 70a is detected. When a touch-up is detected (YES in step S317), the processing proceeds to step S318. On the other hand, when a touch-up is not detected (NO in step S317), the processing returns to step S314. In step S317, the system control unit 50 may change the display form of the touch cursor 502 displayed in the EVF 29 to the display form of the cursor 500 in response to a touch-up operation.

In step S318, the system control unit 50 refers to the system memory 52 to determine whether the slide flag is 0. More specifically, the system control unit 50 confirms whether a touch-move on the touch panel 70a was detected in step S314. When the slide flag is 0, i.e., when a touch-move operation was not detected in step S314 (YES in step S318), the processing proceeds to step S319. On the other hand, when the slide flag is 1, i.e., when a touch-move operation was detected in step S314 (NO in step S318), the processing proceeds to step S321. The slide flag determined to be 0 in step S318 means that the user performed a touch-down on the touch panel 70a and then performed a touch-up without a touch-move. According to the present exemplary embodiment, the system control unit 50 assumes that the user performed a tap operation (a series of operations including a touch-down and a subsequent touch-up) after a menu item selection by using the line-of-sight because the user will determine the menu item selected by using the line-of-sight cursor 501. On the other hand, the slide flag determined to be 1 means that the user will select another menu item instead of the item selected by using the line-of-sight cursor 501. When a touch-move is detected after displaying the line-of-sight cursor 501, as described in step S316, the touch cursor 502 relatively moves by the second amount as a product of the amount of the touch-move and the second coefficient that is smaller than the first coefficient. With the second amount as a result of the multiplication by the second coefficient, the touch cursor 502 does not move from one end to the other end of the touch panel 70a in a single touch-move operation. The touch cursor 502 finely moves for this reason. This enables the user to finely adjust the cursor from the menu item selected by the line-of-sight cursor 501 to the menu item desired by the user.

In step S319, the system control unit 50 performs processing for determining the item at the current cursor position. More specifically, an example of processing for determining the item related to the picture style selected by the line-of-sight cursor 501 will be described below with reference to FIG. 5A. When the user selects the item related to the picture style, the system control unit 50 changes the image quality setting from the Standard mode as a general image quality setting related to the captured image to the Auto or Portrait mode.

In step S320, the system control unit 50 stores the processing for determining the selected item performed in step S319, i.e., a change of the setting item, in the nonvolatile memory 56. Then, the processing exits this control flowchart.

In step S321, the system control unit 50 determines whether a predetermined time period T1 has elapsed since a touch-up in step S317. When the predetermined time period T1 has elapsed (YES in step S321), the processing proceeds to step S322. On the other hand, when the predetermined time period T1 has not elapsed (NO in step S321), the processing proceeds to step S323. Although the predetermined time period T1 is assumed to be about 300 ms, the predetermined time period T1 may be predefined or arbitrarily set by the user.

In step S322, the system control unit 50 enables the movement of the line-of-sight cursor 501 by the line-of-sight input, temporarily disabled and limited in step S310. Then, the processing returns to step S302.

In step S323, the system control unit 50 determines whether a touch-down on the touch panel 70a is detected. When a touch-down is detected (YES in step S323), the processing returns to step S314. On the other hand, when a touch-down is not detected (NO in step S323), the processing returns to step S321. A touch-down performed again before the time period T1 has elapsed since a touch-up in step S317 means that the user will repetitively perform a touch-move on the touch panel 70a. More specifically, the user is highly likely to be repeating a touch-up and a touch-down to further largely move the touch cursor 502. Therefore, when a touch-down on the touch panel 70a is detected again before the time period T1 has elapsed since a touch-up in step S317, the system control unit 50 continues the temporary limitation on the line-of-sight input even if a touch-up is performed. While continuing the temporary limitation on the line-of-sight input and maintaining the gaze position in step S306, the system control unit 50 determines whether a touch-move is detected in step S314. This enables reducing the possibility of the cursor movement by the line-of-sight not intended by the user who will finely adjust the touch cursor 502 by repeating a touch-move while maintaining the gaze position.

In step S324, like step S309, the system control unit 50 determines whether a touch-down on touch panel 70a is detected. When a touch-down is detected (YES in step S324), the processing proceeds to step S325. On the other hand, when a touch-down is not detected (NO in step S324), the processing returns to step S302.

In step S325, the system control unit 50 displays the touch cursor 502 on an item of the setting menu screen in response to a touch-down on the touch panel 70a. Since the line-of-sight input was determined to be set to OFF in step S304, then in step S325, the system control unit 50 does not display the line-of-sight cursor 501 but displays the touch cursor 502 in response to a touch-down. The cursor 500 illustrated in FIG. 5A is the cursor at the initial position displayed when the user displays the setting menu screen. The cursor 500 depends on neither the line-of-sight nor a touch operation. The touch cursor 502 displayed in step S325 refers to the touch cursor 502 in FIG. 5B. The position of the touch cursor 502 displayed in response to a touch-down is displayed at the cursor position displayed before the touch-down operation displayed in the EVF 29. More specifically, when the user performs a touch-down in a state where the cursor 500 is displayed as illustrated in FIG. 5A, the system control unit 50 displays the touch cursor 502, instead of the cursor 500, at the position of the cursor 500 and then relatively moves the cursor.

In step S326, like step S313, the system control unit 50 sets the slide flag to 0 and stores the slide flag in the system memory 52.

In step S327, like step S314, the system control unit 50 determines whether a touch-move on touch panel 70a is detected. When a touch-move is detected (YES in step S327), the processing proceeds to step S328. On the other hand, when a touch-move is not detected (NO in step S327), the processing proceeds to step S330.

In step S328, like step S315, the system control unit 50 sets the slide flag to 1 and stores the slide flag in the system memory 52.

In step S329, the system control unit 50 relatively moves the touch cursor 502 displayed in step S325 in the EVF 29 by the first amount as a product of the amount of the touch-move operation and the first coefficient. The first coefficient is larger than the second coefficient. The system control unit 50 moves the touch cursor 502 by the first amount as a product of the amount of the touch-move operation and the first coefficient. The first coefficient that is large to some extent enables more quickly moving the cursor to the desired position while reducing the number of repetitive finger operations, even with a small amount of a touch-move operation.

In step S330, like step S317, the system control unit 50 determines whether a touch-up from the touch panel 70a is detected. When a touch-up is detected (YES in step S330), the processing proceeds to step S331. On the other hand, when a touch-up is not detected (NO in step S330), the processing returns to step S327.

In step S331, the system control unit 50 refers to the system memory 52 to determine whether the slide flag is 0. More specifically, the system control unit 50 confirms whether a touch-move on the touch panel 70a was detected in step S327. When the slide flag is 0, i.e., when a touch-move was not detected in step S327 (YES in step S331), the processing proceeds to step S319. On the other hand, when the slide flag is 1, i.e., when a touch-move was detected in step S327 (NO in step S331), the processing returns to step S325.

According to the present exemplary embodiment, when a line-of-sight input is detected, the system control unit 50 indicates the setting menu item selected by the line-of-sight input, by using the line-of-sight cursor 501. When a touch-move on the touch panel 70a is detected, the system control unit 50 changes the display form from the line-of-sight cursor 501 to the touch cursor 502 and then moves the touch cursor 502 in response to the touch-move operation. Differentiating the display form between the line-of-sight cursor 501 and the touch cursor 502 enables the user to visually recognize whether the cursor in the EVF 29 is displayed by the line-of-sight or a touch operation without confusion. The user can loosely move the cursor to the desired position by the line-of-sight and then finely adjust the cursor by a touch-move operation as required. When line-of-sight input is not detected, the cursor relatively moves by the amount larger than the amount corresponding to the amount of a touch-move operation when the line-of-sight input is detected. This enables more quickly moving the cursor to the desired position even without the line-of-sight input. More specifically, the user can more quickly and more accurately move the cursor to the desired position without confusion.

In the digital camera 100 using the finder according to the present exemplary embodiment, relative position specification is used as touch operation position specification. Therefore, the position coordinates of a touch operation of the user on the touch panel 70a are not associated with the position coordinates of the display unit 28 on a one-to-one basis. More specifically, since the cursor does not move to the touch position on the touch panel 70a, the user does not need to visually confirm the touch position. For example, even when the user attempts to select a setting menu item (or change a setting menu item) while looking in the finder, the user does not need to detach the eye from the finder to confirm the display unit 28. This enables the user to perform an operation without detaching the eye from the finder, reducing the possibility of making the user feel troublesome or missing a shutter chance.

When the user attempts to finely adjust the cursor position, for example, by operating an operation button such as the cross key 74 after quickly moving the cursor by the line-of-sight input, the user needs to find the cross key 74 out of many operation buttons on the digital camera 100. Recent digital cameras in smaller sizes are provided with various operation buttons mounted in a narrower space. In contrast, the touch panel 70a (display unit 28) occupies a large area on the rear face of the digital camera 100, and therefore is easier to access than particular operation buttons.

Figure 6A:
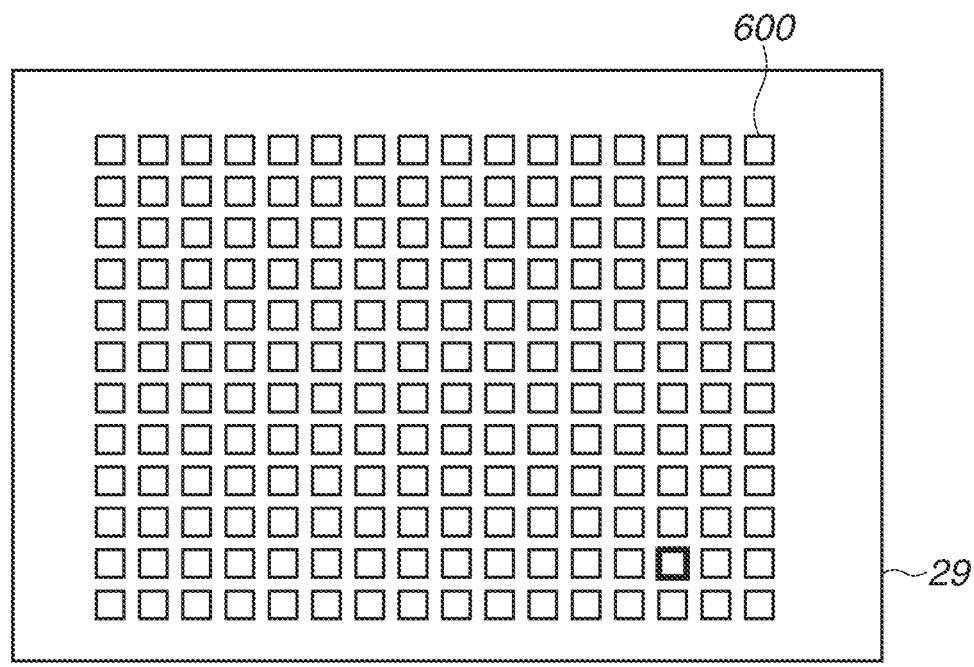
FIG. 6A illustrates an example display of in-finder focusing point selection according to the present exemplary embodiment.
Figure 6B:
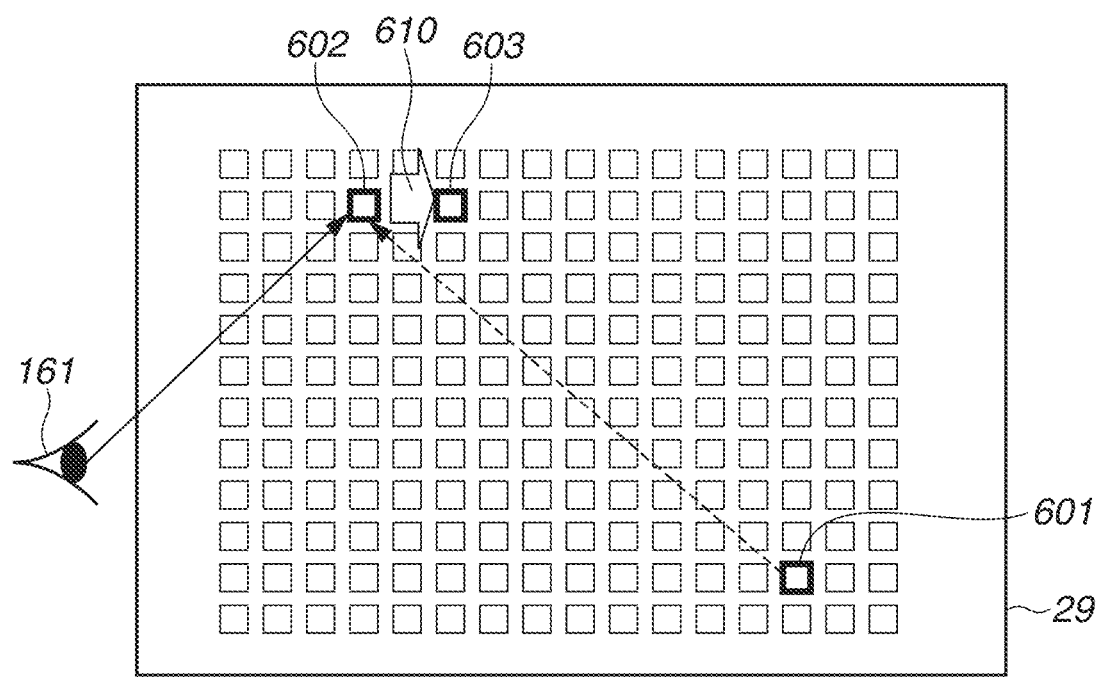
FIG. 6B illustrates another example display of in-finder focusing point selection according to the present exemplary embodiment.

Although, in the examples illustrated in FIGS. 3 to 5, the cursor position movement in the setting menu screen has been described, the specification of the present application is not limited thereto. For example, the specification of the present application is also applicable to a case where a focusing point to be used for automatic focus (AF) is selected from a plurality of focusing points in the image capturing mode. With the increase in the number of focusing points (focus detection regions) arbitrarily selectable by the user, the user needs to perform operations many times to finely adjust the cursor from the line-of-sight position by using the cross key 74. FIGS. 6A and 6B illustrate example displays for focusing point selection in the finder. FIG. 6A illustrates a plurality of focusing points 600 arbitrarily selectable by the user. In recent years, some digital cameras have about 5,000 focusing points selectable by the user. Assume that, with a digital camera having a number of such selectable focusing points, a focusing point existing at the position of a focusing point 601 is moved to the position of a focusing point 602 by the user's line-of-sight, as illustrated in FIG. 6B. In this case, the focusing point is moved based on the user's gaze position, and, for example, the focusing point intended by the user is not the focusing point 602 but a focusing point 603. To move the focusing point by using the cross key 74, the user needs to press twice the right direction side of the cross key 74. In contrast, to move the focusing point by using a touch operation, the user needs to perform a single touch-move operation on the touch panel 70a. This enables moving the focusing point by the amount of movement 610 to reach the desired position. FIGS. 6A and 6B illustrate an example of pressing the cross key 74 twice. If the focusing point position desired by the user is in the obliquely lower direction when viewed from the focusing point 602, the number of operations on the cross key 74 to be performed increases. The amount of movement 610 increases with increasing the amount of a touch-move operation and decreases with decreasing the amount of a touch-move operation performed by the user. Therefore, the user can more quickly and more accurately move the focusing point to the desired position by performing a single touch-move operation even if the focusing point 603 intended by the user is far to some extent from the focusing point 602.

As described above in steps S318 to S320 illustrated in FIG. 3, the system control unit 50 performs processing for determining the item at the current cursor position if a touch-move operation on the touch panel 70a is not detected (if only a tap operation is detected). To execute a setting menu item selected by the user's line-of-sight input, the user needs to issue a certain determination instruction. For example, when a gaze is specified as an item determination instruction, prolonging the gaze determination time takes longer time until a determination instruction is issued, possibly missing a shutter chance. On the other hand, reducing the gaze determination time may increase the possibly of issuance of a determination instruction not intended by the user, possibly making the user feel troublesome. Therefore, a determination instruction that can definitely reflect the user's intention is required. When a tap operation is used as a determination instruction as described above in the present exemplary embodiment, the user issues a determination instruction for executing the item at the position of the line-of-sight cursor if a touch-move is not detected. When the user more accurately performs fine adjustment from the position of the line-of-sight cursor with a touch-move and then taps the same position without further moving the finger, the user can issue a determination instruction. As described above, the touch panel 70a subjected to touch operations occupies a wider range than the operation buttons on the digital camera 100, and therefore is easier to access. The touch panel 70a enables the user to issue a determination instruction and a fine adjustment (correction) instruction only with touch operations, and easily perform operations without moving the finger to various positions. Thus, by issuing a determination instruction through a tap operation, the user can more quickly and more accurately move the cursor by using the line-of-sight and touch operations, and more quickly issue a determination instruction through touch operations.

When the user operates an arrow key, such as the cross key 74 or a multi-controller (not illustrated) that enable operations in eight directions, during the flow control illustrated in FIG. 3, the cursor can be moved from the cursor position displayed at the time of the operation in response to the operations on the arrow key. More specifically, when a key operation, not a touch-move, is performed when the line-of-sight cursor 501 by the line-of-sight input is displayed, the cursor moves from the position of the line-of-sight cursor 501. When the eye tracking is set to OFF, the cursor moves from the cursor 500 illustrated in FIG. 5A in response to the key operation. The cursor moved in response to this arrow key operation may be a cursor in a display mode different from the line-of-sight cursor 501 in the line-of-sight selection display mode. The display form may be the same as that of the touch cursor 502 in the touch operation display mode or may be a different cursor display form. When the first shutter switch 62 turns ON during the flow control, the system control unit 50 transitions from the setting menu screen display to the shooting standby state and starts a shooting preparation operation. When the second shutter switch 64 is pressed, the system control unit 50 transitions from the setting menu screen display to the shooting standby state and performs image capturing processing. When the mode selection switch 60 is operated, the system control unit 50 changes the mode in response to the operation and then transitions to the shooting standby state without returning to the menu screen.

Although, in the control flowchart in FIG. 3, the system control unit 50 performs processing for determining the selected menu item with a tap operation on the touch panel 70a, the determination processing does not need to be performed by a simple tap operation. The determination processing may not be performed by a simple tap operation. After the touch-up operation in steps S317 and S330, the system control unit 50 may perform the determination processing upon depression of an operation button on the digital camera 100, such as the SET button 75.

The digital camera 100 may be configured to detect a press on the touch panel 70a and perform the determination processing in response to a press on the touch panel 70a. More specifically, a pressure sensor (not illustrated) detects the pressing force on the operation surface of the display unit 28 (the operation surface of the touch panel 70a) to detect the strength of a touch operation. The pressure sensor can continuously detect the strength of the pressing force when the display unit 28 is pressed by a touch operation. One or a plurality of strain gauge sensors may be disposed at a portion distorted by the pressing force on the operation surface of the display unit 28 to detect the pressing force on the operation surface of the touch panel 70a based on the output value from the strain gauge sensor. Alternatively, by using a capacitance sensor disposed parallel to the touch panel 70a, the system control unit 50 calculates the distance between the finger on the operation surface and the capacitance sensor based on the capacitance value upon distortion of the operation surface by the pressing force on the operation surface of the display unit 28. The system control unit 50 may calculate the pressure based on the distance or equally handle the distance and the pressure. Other types of pressure sensors are also applicable as long as the pressing force on the operation surface of the touch panel 70a can be detected. For example, if an operation on the operation surface is performed by using a stylus, a sensor disposed on the stylus side may detect the pressure applied to the tip of the stylus, and the system control unit 50 may detect the strength (pressing force) of a touch operation based on the output from the sensor. The sensor may detect the force of the touch on the operation surface or a substitute of the pressure of the touch (for example, the distance between the finger on the operation surface and the capacitance sensor). The system control unit 50 may detect the strength (pressure) of a touch operation by using diverse methods, and diverse sensors, or a combination of a plurality of sensors (e.g., a weighted average of sensors). The pressure sensor may be integrally formed with the touch panel 70a. Hereinafter, a pressing operation on the operation surface of the display unit 28 is referred to as a "touch-push". With the digital camera 100 that mounts the touch panel 70a provided with this pressure sensor, the system control unit 50 may determine whether to perform the determination processing in step S319 according to whether a touch-push is detected before a touch-up in steps S317 and S330. This means that the system control unit 50 can determine whether to perform the determination processing in step S319 regardless of whether the slide flag is determined to be 0 in steps S318 and S331 (i.e., whether a touch-move was detected). The system control unit 50 may determine whether a fixed time period has elapsed since a touch-up till a touch-down in step S321 based on a touch-push operation, not by determining the user's intention to determine an item based on the measured time.

FIG. 7 is a control flowchart illustrating processing for determining whether a gaze was detected in step S306 in FIG. 3. This control processing is implemented when the system control unit 50 loads a program stored in the non-volatile memory 56 into the system memory 52 and then executes the program. The flowchart illustrated in FIG. 7 is started when the user activates the digital camera 100 in the image capturing mode, the eye tracking setting is ON, and the line-of-sight input is detected (a state where the line-of-sight detection block 160 has detected the user's line-of-sight).

In step S701, the system control unit 50 calculates the difference between the line-of-sight detection position P(K) detected by the line-of-sight detection block 160 and the line-of-sight detection position P(K−1) that had been detected before the line-of-sight was detected at the position P(K). This difference is assumed to be the amount of movement ΔP at the line-of-sight detection position (hereinafter referred to as the amount of line-of-sight movement ΔP). The amount of line-of-sight movement ΔP is represented by the following formula:

$$\Delta P = P(K) - P(K-1)$$

For example, when the system control unit 50 detects the line-of-sight position at 30-ms intervals, the system control unit 50 detects the line-of-sight detection position P(K−1) 30 ms before the detection of the position P(K), where K denotes a count value representing the number of times the control flowchart in FIG. 7 is processed. Then, the system control unit 50 stores the count value K in the system memory 52.

In step S702, the system control unit 50 determines whether the amount of movement ΔP at the line-of-sight detection position ΔP calculated in step S701 is smaller than a predetermined threshold value of the amount of movement, Lo. More specifically, the system control unit 50 determines whether the line-of-sight position stays at a particular position. When ΔP is smaller than Lo (ΔP<Lo), i.e., when the line-of-sight position stays within a particular position range (YES in step S702), the processing proceeds to step S703. On the other hand, when ΔP is equal to or larger than Lo (ΔP≥Lo), i.e., when the line-of-sight position is largely moving without staying within the particular position range (NO in step S702), the processing proceeds to step S704. The predetermined threshold value of the amount of movement, Lo, indicates the amount of movement at the line-of-sight detection position in the EVF 29. When the amount of movement ΔP at the line-of-sight detection position is smaller than Lo, the system control unit 50 assumes that the user is gazing at a particular position. The system control unit 50 determines that ΔP is smaller than Lo (ΔP<Lo), the system control unit 50 measures the time duration during which ΔP is smaller than Lo by using the system timer 53. For example, when the system control unit 50 detects the line-of-sight position at 30-ms intervals, the system control unit 50 can detect whether ΔP is smaller than Lo at 30-ms intervals. The predetermined threshold value of the amount of movement, Lo, may also be a predefined fixed value, a value that can be arbitrarily set by the user, or a variable value that depends on a certain condition or status. For example, the threshold value Lo may be increased with decreasing the distance from the line-of-sight position to the outer frame of the EVF 29. By determining whether the amount of line-of-sight movement ΔP is smaller than the threshold value of the amount of movement, Lo, in step S702, the system control unit 50 can determine whether a gaze is detected even with involuntary fine fluctuations of the eye, called the involuntary eye movement.

In step S703, the system control unit 50 increments a timer count value T corresponding to the time of the time measurement started in step S702, by using the system timer 53. Then, the processing proceeds to step S705. The timer count value T is stored in the system memory 52. When the system control unit 50 detects the line-of-sight position at 30-ms intervals, for example, as described in step S701, the system control unit 50 increments the timer count value T at 30-ms intervals. After the time measurement is started, T becomes 1 when 30 ms has elapsed and becomes 2 when another 30 ms has elapsed (60 ms has elapsed in total).

In step S704, the system control unit 50 clears the timer count value T to 0. Then, the processing proceeds to step S707. The timer count value T is stored in the system memory 52. This indicates a case where ΔP is equal to or larger than Lo (ΔP≥Lo), i.e., the line-of-sight was determined to be largely moving in step S702.

In step S705, the system control unit 50 determines whether the timer count value T is larger than a predetermined timer count threshold value Tth. When T is larger than the predetermined time count threshold value Tth (T>Tth) (YES in step S705), the processing proceeds to step S706. On the other hand, when T is equal to or smaller than the predetermined timer count threshold value Tth (T≤Tth) (NO in step S705), the processing proceeds to step S707. For example, when the predetermined timer count threshold value Tth is 1 (e.g., T=1 means 30 ms), a gaze can be determined in a short gaze time, making it possible to immediately display the position index such as the cursor by the line-of-sight. However, the position index suitably moves in response to unconscious movement of the line-of-sight, not the involuntary eye movement, possibly making the user feel troublesome. On the other hand, when Tth=30 (e.g., 900 ms), a gaze is determined in a prolonged gaze time, and the user needs to keep gazing at the same position during the gaze time. However, the possibility of making the user feel troublesome can be reduced because the position index by the line-of-sight does not finely move. The predetermined timer count threshold value Tth may be a predefined fixed value, a value that can be arbitrarily set by the user, or a value that may be increased with small ΔP or decreased with large ΔP.

In step S706, the system control unit 50 determines that the user is gazing at a particular position when the timer count value T corresponding to the time when the time measurement was started in step S702 is larger than the threshold value Tth (T>Tth), and records the determination result in the system memory 52.

In step S707, the system control unit 50 increments the count value K representing the number of times the control flowchart in FIG. 7 is processed, and stores the count value K in the system memory 52. The count values T and K are initialized when power of the digital camera 100 is turned OFF and then back ON to activate the digital camera 100. Power of the digital camera 100 is turned OFF when the power switch is turned OFF or the automatic power-off function is activated. The automatic power-off function is a function that turns power of the digital camera 100 OFF when no operation lasts for a predetermined time duration, e.g., about one minute.

In this way, the system control unit 50 determines whether a gaze is detected in step S306 in FIG. 3 based on the result of the determination by the control flowchart in FIG. 7.

As described above, according to the present exemplary embodiment, the system control unit 50 determines that the user is gazing at a particular position when the timer count value T corresponding to the time duration during which ΔP<Lo is satisfied exceeds the predetermined time threshold value Tth while the amount of movement ΔP at the line-of-sight detection position is smaller than the predetermined threshold value of the amount of movement, Lo. The predetermined time threshold value Tth may be decreased with increasing the difference between the currently selected cursor display position Po and the current line-of-sight detection position P(K). More specifically, the configuration as illustrated in FIG. 8 is also applicable.

Determining (displaying) the line-of-sight position based on a gaze as illustrated in FIG. 7 prevents the line-of-sight position from being displayed each time the user unconsciously finely moves the line-of-sight or largely moves the line-of-sight, thus reducing the possibility of making the user feel troublesome.

FIG. 8 illustrates control for changing the threshold value for the gaze determination time according to the present exemplary embodiment.

A position 800 indicates the selected position displayed in the EVF 29, and is assumed to be a selected position Po. FIG. 8 is a graph illustrating a relation between the amount of movement L and the timer count value T with the varying distance from the selected position Po as the origin.

When the line-of-sight detection position (line-of-sight input position) is assumed to be a position 801, the position 801 is referred to as P1(K). In this case, the amount of cursor movement L1 is represented by L1=|P1(K)−Po|. The time threshold value Tth at this timing is T1.

On the other hand, when the line-of-sight detection position (line-of-sight input position) is assumed to be a position 802, the position 802 is referred to as P2(K). In this case, the amount of cursor movement L2 is represented by L2=|P2(K)−Po|. The time threshold value Tth at this timing is T2.

In this case, there is a proportional relation between the amount of movement L and the time threshold value Tth, i.e., the time threshold value Tth decreases with increasing the amount of movement L with respect to the selected position Po. More specifically, the relation is represented by |A2|=|A1|, where A2 denotes the inclination of the straight line connecting Po and P2(K), and A1 denotes the inclination of the straight line connecting Po and P1(K), as illustrated in FIG. 8. Therefore, T1>T2 when L1<L2. This means that the value Tth increases with decreasing the value L, making it possible to prevent the cursor from moving each time the line-of-sight finely fluctuates. More specifically, this configuration prevents the cursor from finely moving in response to unconscious fluctuations of the user's line-of-sight. On the other hand, the value Tth decreases with increasing the value L. Since a large movement of the line-of-sight is assumed to be an intentional movement by the user, the cursor can be largely moved in a short time.

When the distance between the display position of the selected position and the line-of-sight position is long, the gaze determination time is reduced. On the other hand, when the distance is short, the gaze determination time is prolonged. This enables the user to more quickly specify the line-of-sight position when largely moving the line-of-sight, and more accurately specify the line-of-sight position when finely moving the line-of-sight.

The present exemplary embodiment has been described above centering on the display methods illustrated in FIGS. 5A and 5B as examples of selected target display methods in the "line-of-sight selection display mode" and the "touch selection display mode", respectively. However, the present invention is not limited thereto. For example, applicable methods for displaying indicators as various types of cursors include a display method using an arrow-shaped icon, a display method using a round icon, and any other display methods. For example, changing the icon color for each display mode enables the user to visually recognize the currently used display mode, making it hard to cause operation errors, like the exemplary embodiment illustrated in FIGS. 5A and 5B. As described above, the user can select either one of the absolute position specification and the relative position specification as the position specification method for a touch-move operation in the eye-on state. According to the present exemplary embodiment, however, the relative position specification is selected as the position specification corresponding to a touch-move operation regardless of the user setting. When the absolute position specification is selected as the position specification method for a touch-move operation, the cursor will be displayed at the position in the EVF 29 corresponding to the position where the user performed a touch operation on the touch panel 70a. To allow the user looking in the EVF 29 to accurately check the touch position, the user needs to detach the eye from the EVF 29 and then view the touch panel 70a. If the user touches the touch panel 70a without detaching the eye from the EVF 29, the user is unable to grasp the correct touch position until the user performs a touch operation. When the user is looking in the EVF 29 with the right eye, for example, the user's finger is hard to reach a position to the left of the center of the display unit 28 when the setting menu screen is displayed. Setting items and the page number may be displayed at positions where the user's finger is hard to reach. Therefore, when the absolute position specification is selected as the position specification method corresponding to a touch-move operation, the user may be unable to select the selected position. Therefore, according to the present exemplary embodiment, the relative position specification is selected as the position specification method corresponding to a touch-move operation regardless of the user setting.

According to the configuration of the present exemplary embodiment, the system control unit 50 performs the processing for determining the selected cursor only when the slide flag is set to 1. The slide flag is cleared only when a touch-move is not detected. Therefore, when a touch-up is detected while a touch-move is being detected, the slide flag is not cleared. This configuration is suitable for an operation for sequentially moving the cursor frame position by using the touch panel.

Figure 9:
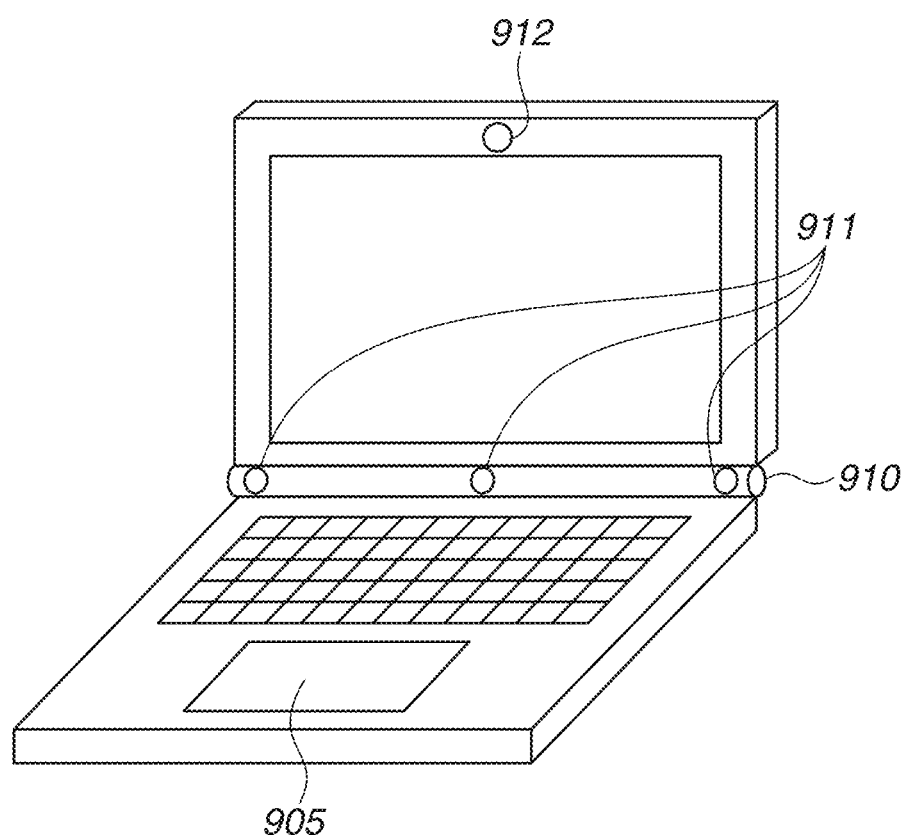
FIG. 9 illustrates an example case where no finder is used according to the present exemplary embodiment.

According to the above-described exemplary embodiment, the system control unit 50 detects the line-of-sight of the user looking in the finder and performs position specification in combination with a position specification operation by using the touch panel outside the finder to move the selected position displayed in the finder, the present invention is not limited thereto. FIG. 9 illustrates an exemplary embodiment where the EVF 29 is not used in the present exemplary embodiment.

FIG. 9 illustrates an example of moving the mouse pointer by using the touch pad of a notebook personal computer. FIG. 9 illustrates a touch pad 905 as a counterpart of the touch panel 70a according to present exemplary embodiment. As the line-of-sight detection block 160 in the notebook personal computer, an independent line-of-sight detection apparatus 910 is connected to the notebook personal computer. A camera 911 mounted on the line-of-sight detection apparatus 910 and a built-in camera 912 of the notebook personal computer are used to determine the line-of-sight position. With the notebook personal computer, the mouse pointer moves to the line-of-sight position in response to the line-of-sight input, like the present exemplary embodiment. In response to a touch-move operation on the touch pad 905, the mouse pointer displayed at the line-of-sight position relatively moves by the second amount (smaller than the first amount for the same amount of a touch-move) as a product of the amount of a touch-move operation and the second coefficient (<first coefficient). This enables finely adjusting the mouse pointer even with the touch pad.

Although, a notebook personal computer has been described above as an example of other exemplary embodiments, the present invention is not limited thereto. The present exemplary embodiment is also applicable by using not only the touch pad on a notebook personal computer but also a mouse, pointing device, or joystick. A touch pad, mouse, pointing device, and joystick do not need to be built in the notebook personal computer but may be externally provided.

Like the present exemplary embodiment, a touch-move operation or a movement instruction operation on a position corresponding to a touch-move are possible by using the touch pad or joystick mounted on a remote controller such as a pointer. In this case, the line-of-sight detection block 160 is assumed to be mounted on or connected with an external monitor or projector. The line-of-sight detection sensor may be independent of an external monitor, projector, and pointer.

As described above, when the line-of-sight input is detected, the line-of-sight cursor 501 indicates the setting menu item selected by the line-of-sight input. When a touch-move on the touch panel 70a is performed, the system control unit 50 changes the display form from the line-of-sight cursor 501 to the touch cursor 502 and then moves the touch cursor 502 in response to the touch-move operation. Differentiating the display form between the line-of-sight cursor 501 and the touch cursor 502 enables the user to visually recognize without confusion whether the cursor in the EVF 29 is displayed by the line-of-sight or a touch operation. This enables the user to loosely move the cursor to the desired position by the line-of-sight and then finely adjust the line-of-sight cursor specified by the line-of-sight by a touch-move operation as required. More specifically, the user can more quickly and more accurately move the cursor to the desired position. The above-described various controls to be performed by the system control unit 50 may be performed by one hardware component, or the entire apparatus may be controlled by a plurality of hardware components (for example, a plurality of processors and circuits) which share processing.

While the present invention has specifically been described based on exemplary embodiments, the present invention is not limited to these specific exemplary embodiments. Diverse embodiments not departing from the spirit and scope of the present invention are also included in the present invention. Although an example of the touch panel 70a has been described above as a member for specifying position movement to be used together with the line-of-sight input, other operation members such as buttons and dials are also applicable. Although the AF frame is used as the display position, an icon frame or parameter setting frame are also applicable. An indicator different from the AF frame, such as a mouse pointer, is also applicable. Although the accumulation time after the line-of-sight input to the line-of-sight detection block 160 is started is used as a gaze determination criterion, a preset accumulation time is also applicable. The gaze determination criterion may be changed according to the relation between the position of the displayed AF frame and the line-of-sight position, or may be arbitrarily set by the user. Although the present exemplary embodiment is based on a gaze as a criterion for determining the line-of-sight position intended by the user, the present invention is not limited thereto. The system control unit 50 may determine the line-of-sight position based not on a gaze but only on the ON/OFF setting of the line-of-sight input (line-of-sight AF of the setting item 403 in FIG. 4).

Although, in the above-described exemplary embodiment, the present invention is applied to the digital camera, the present invention is not limited thereto but applicable to electronic apparatuses having a reception unit that receives the line-of-sight input. These exemplary embodiments can be suitably combined. Although, in the present exemplary embodiment, the EVF 29 and line-of-sight detection are used, the present exemplary embodiment is also applicable to a configuration for using a display apparatus and line-of-sight detection. More specifically, the present invention is applicable to personal computers, personal digital assistants (PDAs), portable telephone terminals, portable image viewers, printer apparatuses having a display, digital photo frames, and music players. The present invention is also applicable to game machines, electronic book readers, and wearable devices such as head mount displays.

OTHER EXEMPLARY EMBODIMENTS

The present invention is also implemented by performing the following processing. Specifically, software (program) for implementing the functions of the above-described exemplary embodiment is supplied to a system or apparatus via a network or various types of storage media, and a computer (or CPU or micro processing unit (MPU)) of the system or apparatus reads and executes the program code. In this case, the program and the storage medium storing the program are included in the present invention.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to more quickly and more accurately move a selected position to a position intended by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus comprising:
an imaging unit configured to image a subject;
an eyepiece portion configured to visually recognize an image of the subject;
a display unit configured to enable visual recognition via the eyepiece portion;
a detection unit configured to detect a gaze point by a line-of-sight of a user looking at the display unit; and
a control unit configured to, in a state where selected position specification based on the gaze point is performed, perform control, upon performance of a move operation for movement while in contact with an operation surface of an operation unit, to move a selected position displayed on the display unit from a position based on the gaze point to a position corresponding to a direction and an amount of movement of the move operation.

2. The electronic apparatus according to claim 1,
wherein the operation unit receives the move operation and a predetermined operation different from the move operation, and
wherein, in a state where the selected position specification based on the gaze point is performed, the control unit perform control, in a case where the predetermined operation is performed on the operation unit and then completed without the move operation being performed, to execute a function corresponding to the selected position based on the gaze point regardless of a touched position on the operation surface.

3. The electronic apparatus according to claim 1,
wherein the operation unit receives the move operation and a predetermined operation different from the move operation, and
wherein the control unit performs control, before the predetermined operation on the operation surface of the operation unit is performed, to display the selected position based on the gaze point on the display unit in a first display form, and after the move operation is performed, to display the selected position in a second display form different from the first display form.

4. An electronic apparatus comprising:
a detection unit configured to detect a gaze point by a line-of-sight of a user; and
a control unit configured to, in a state where selected position specification based on the gaze point is performed, perform control,
before a predetermined operation is performed on an operation unit that receives a move operation for moving a selected position and the predetermined operation different from the move operation, to display the selected position based on the gaze point on a display unit in a first display form,
after the move operation is performed, to move the selected position from a position based on the gaze point to a position corresponding to a direction and an amount of movement of the move operation with the selected position displayed in a second display form different from the first display form, and
in a case where the predetermined operation is performed on the operation unit and then completed without the move operation being performed, to execute a function corresponding to the selected position based on the gaze point regardless of a position where the predetermined operation is performed.

5. The electronic apparatus according to claim 1, wherein the control unit displays the selected position in a third display form upon performance of the predetermined operation before the move operation is performed.

6. The electronic apparatus according to claim 2, wherein the predetermined operation is a touch on the operation surface.

7. The electronic apparatus according to claim 1, wherein the control unit performs control, after the move operation on the operation unit is performed, to change an item to be selected at the selected position from a first item at the position based on the gaze point to a second item at the position corresponding to the direction and the amount of movement of the move operation.

8. The electronic apparatus according to claim 2 wherein the control unit performs control, while moving the selected position to a position based on the gaze point before starting the predetermined operation on the operation unit or on the gaze point when starting the predetermined operation, and the predetermined operation is continuously being performed, not to move the selected position corresponding to the gaze point.

9. The electronic apparatus according to claim 2, wherein the control unit performs control, after moving the selected position from the position based on the gaze point in response to the move operation, not to move the selected position corresponding to the gaze point since the predetermined operation is completed until a predetermined time period has elapsed.

10. The electronic apparatus according to claim 1, further comprising a display control unit configured to display an indicator that indicates a selected position at the selected position on the display unit.

11. The electronic apparatus according to claim 10, wherein the indicator is displayed upon performance of an operation on the operation unit, and is not displayed before the operation is performed.

12. The electronic apparatus according to claim 1, wherein, in a state where selected position specification based on the gaze point is performed, a condition that an amount of movement of a position (where the gaze point is detected) within a predetermined time period is equal to or less than a predetermined threshold value is satisfied.

13. The electronic apparatus according to claim 12, wherein the control unit decreases the predetermined time period with increasing a distance between the selected position and an input position based on the gaze point, and increases the predetermined time period with decreasing the distance.

14. The electronic apparatus according to claim 1, wherein the control unit performs control,
   in a state where selected position specification based on the gaze point is not performed, to move the selected position by a first amount as a product of the amount of movement and a first coefficient according to the direction and the amount of movement of the move operation, and
   in a state where selected position specification based on the gaze point is performed, to move the selected position by a second amount as a product of the amount of movement and a second coefficient smaller than the first coefficient according to the direction and the amount of movement of the move operation.

15. The electronic apparatus according to claim 1, wherein the selected position is a selected position where an item of a setting menu screen is selected.

16. The electronic apparatus according to claim 1, wherein the selected position is a selected position in a focus detection region.

17. The electronic apparatus according to claim 4, further comprising:
   an imaging unit configured to image a subject;
   an eyepiece portion configured to visually recognize an image of the subject; and
   a display unit configured to enable visual recognition via the eyepiece portion,
   wherein the detection unit detects a gaze point by the line-of-sight of the user looking at the display unit.

18. A control system including an electronic apparatus having an imaging unit that images a subject and a control apparatus that controls the electronic apparatus, the control system comprising:
   an eyepiece portion configured to visually recognize an image of the subject;
   a display unit configured to enable visual recognition via the eyepiece portion;
   a detection unit configured to detect a gaze point by a line-of-sight of a user looking at the display unit; and
   a control unit configured to, in a state where selected position specification based on the gaze point is performed, perform control, upon performance of a move operation for movement while in contact with an operation surface of an operation unit, to move a selected position displayed on the display unit from a position based on the gaze point to a position corresponding to a direction and an amount of movement of the move operation.

19. A method for controlling an electronic apparatus comprising:
   an imaging unit configured to image a subject;
   an eyepiece portion configured to visually recognize an image of the subject; and
   a display unit configured to enable visual recognition via the eyepiece portion,
   the method comprising:
   detecting a gaze point by a line-of-sight of a user looking at the display unit; and
   performing control, in a state where selected position specification based on the gaze point is performed, upon performance of a move operation for movement while in contact with an operation surface of an operation unit, to move a selected position displayed on the display unit from a position based on the gaze point to a position corresponding to a direction and an amount of movement of the move operation.

20. A method for controlling an electronic apparatus, the method comprising:
   detecting a gaze point by a line-of-sight of a user; and
   performing control, in a state where selected position specification based on the gaze point is performed,
   before a predetermined operation is performed on an operation unit that receives a move operation for moving a selected position and the predetermined operation different from the move operation, to display the selected position based on the gaze point on a display unit in a first display form,
   after the move operation is performed, to move the selected position from a position based on the gaze point to a position corresponding to a direction and an amount of movement of the move operation with the selected position displayed in a second display form different from the first display form, and
   in a case where the predetermined operation is performed on the operation unit and then completed without the move operation being performed, to execute a function corresponding to the selected position based on the gaze point regardless of a position where the predetermined operation is performed.

21. A method for controlling an imaging control system including an electronic apparatus having an imaging unit that images a subject and a control apparatus that controls the electronic apparatus, the imaging control system comprising:
   an eyepiece portion configured to visually recognize an image of the subject; and
   a display unit configured to enable visual recognition via the eyepiece portion,
   the method comprising:
   detecting a gaze point by a line-of-sight of a user looking at the display unit; and
   performing control, in a state where selected position specification based on the gaze point is performed, upon performance of a move operation for movement while in contact with an operation surface of an operation unit, to move a selected position displayed on the display unit from a position based on the gaze point to a position corresponding to a direction and an amount of movement of the move operation.

22. A non-transitory computer-readable recording medium storing a program for causing a computer to function as each unit of the electronic apparatus according to claim 1.

* * * * *